United States Patent
Frolov

(10) Patent No.: US 10,878,189 B2
(45) Date of Patent: Dec. 29, 2020

(54) METHOD FOR CORRECTING A MISTYPED WORD RESULTING FROM AT LEAST ONE OF AN INACCURATE KEYBOARD INPUT AND A WRONG KEYBOARD LAYOUT AND SYSTEM IMPLEMENTING THEREOF

(71) Applicant: YANDEX EUROPE AG, Lucerne (CH)

(72) Inventor: Anton Viktorovich Frolov, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 441 days.

(21) Appl. No.: 16/022,807

(22) Filed: Jun. 29, 2018

(65) Prior Publication Data
US 2019/0197099 A1    Jun. 27, 2019

(30) Foreign Application Priority Data
Dec. 27, 2017   (RU) .................. 2017146274

(51) Int. Cl.
| G06F 17/27 | (2006.01) |
| G06F 3/0488 | (2013.01) |
| G06N 99/00 | (2019.01) |
| G06F 40/232 | (2020.01) |
| G06N 20/00 | (2019.01) |

(Continued)

(52) U.S. Cl.
CPC ........ *G06F 40/232* (2020.01); *G06F 3/04886* (2013.01); *G06F 16/951* (2019.01); *G06F 40/216* (2020.01); *G06N 20/00* (2019.01); *G06F 3/04842* (2013.01)

(58) Field of Classification Search
CPC . G06F 3/04842; G06F 3/04886; G06F 40/232
See application file for complete search history.

(56) References Cited

U.S. PATENT DOCUMENTS

| 5,956,739 A | 9/1999 | Golding et al. |
| 9,037,967 B1 | 5/2015 | Al-Jefri et al. |

(Continued)

OTHER PUBLICATIONS

"Daniel Bernhardt Visit", CS and Maths Tutorials: Bringing it Together, 2014, 3 pages, http://opendsi.cc/tutorials/2014/11/24/daniel-bernhardt-visit.html.

(Continued)

*Primary Examiner* — Sang H Kim
(74) *Attorney, Agent, or Firm* — BCF LLP

(57) ABSTRACT

A method and system for correcting a mistyped word resulting from at least one of an inaccurate keyboard input and wrong keyboard layout is disclosed. The method comprises selecting a first n-characters of a first word, selecting candidate characters that are likely subsequent characters to the first n-characters by calculating a candidate score value for each candidate character; generating a respective positive reformulated word for each selected candidate characters which corresponds to the first word having replaced the n+1 character with the respective candidate character; and training a machine learning algorithm (MLA) to determine a set of features representing a property between each reformulated words and the first word; and training the MLA to determine the reformulated word having an absence of a mistype.

18 Claims, 8 Drawing Sheets

(51) Int. Cl.
*G06F 16/951* (2019.01)
*G06F 40/216* (2020.01)
G06F 3/0484 (2013.01)

(56) References Cited

U.S. PATENT DOCUMENTS

| | | | |
|---|---|---|---|
| 2005/0251744 A1* | 11/2005 | Brill | G06F 40/232 715/257 |
| 2000/6167676 | 7/2006 | Plumb | |
| 2010/0050074 A1 | 2/2010 | Nachmani et al. | |
| 2010/0125725 A1 | 5/2010 | Akrout et al. | |
| 2010/0259561 A1 | 10/2010 | Forutanpour et al. | |
| 2011/0201387 A1* | 8/2011 | Paek | G06F 40/166 455/566 |
| 2013/0046544 A1* | 2/2013 | Kay | G06F 3/04886 704/275 |
| 2014/0327622 A1 | 11/2014 | Ouyang et al. | |

OTHER PUBLICATIONS

"Spelling Correction in Search Engines—Algorithms & Strategies", Data Science Greedy, 2016, 4 pages, https://prdeepakbabu.wordpress.com/2016/02/29/spelling-correction-in-search-engines-algorithms-strategies/.

* cited by examiner

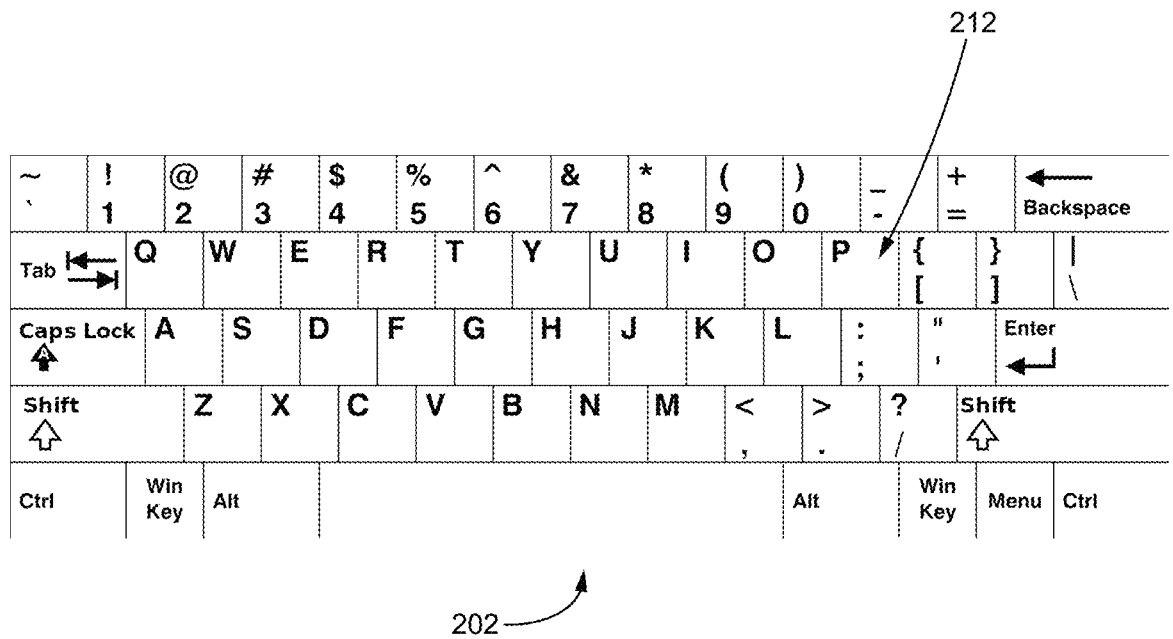
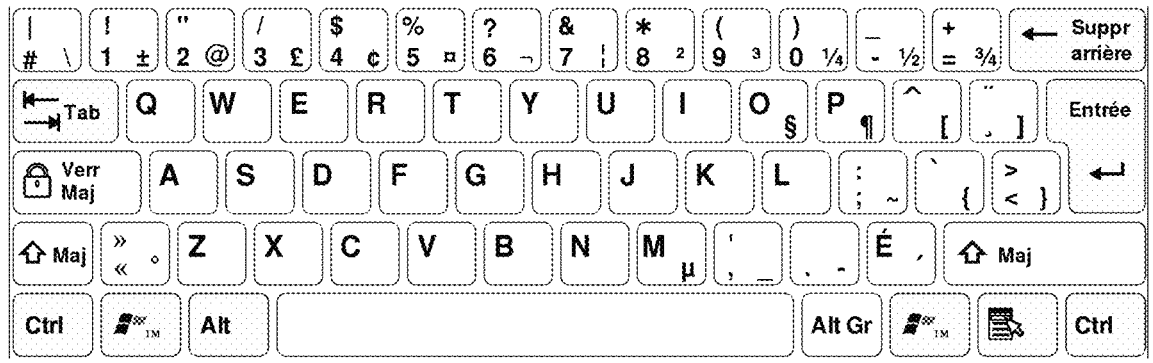
Fig. 2

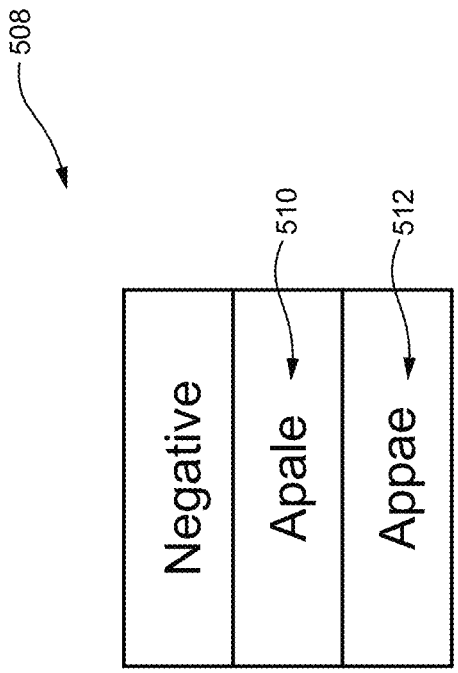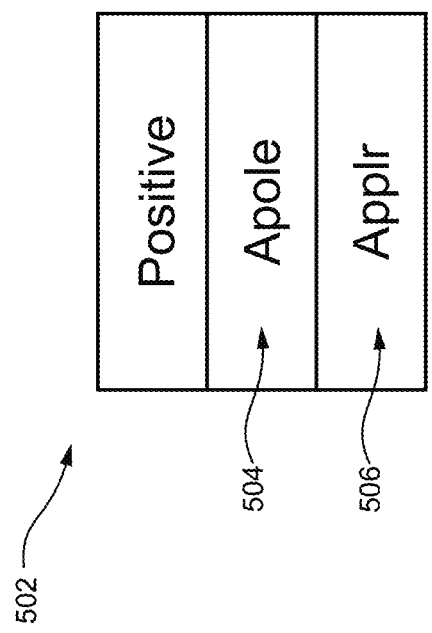
Fig. 5

METHOD FOR CORRECTING A MISTYPED WORD RESULTING FROM AT LEAST ONE OF AN INACCURATE KEYBOARD INPUT AND A WRONG KEYBOARD LAYOUT AND SYSTEM IMPLEMENTING THEREOF

CROSS-REFERENCE

The present application claims priority to Russian Patent Application No. 2017146274, entitled "Method For Correcting A Mistyped Word Resulting From At Least One Of An Inaccurate Keyboard Input And A Wrong Keyboard Layout And System Implementing Thereof", filed Dec. 27, 2017, the entirety

FIELD

The present technology generally relates to correcting a mistyped word and, more particularly, to a system and method for correcting a mistyped word resulting from at least one of an inaccurate keyboard input and a wrong keyboard layout.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of electronic devices (desktop, laptop, notebook, smartphone, tablets and the like) to have access to any number of web pages and rich content (like images, audio, video, animation, and other multimedia content from such networks).

Generally speaking, a given user can access a resource on the communication network by two principal means. The given user can access a particular resource directly, either by typing an address of the resource (typically an URL or Universal Resource Locator, such www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

There are numerous search engines available to the user. Some of them are considered to be general purpose search engines (such as Yandex™, Google™, Yahoo™ and the like). Other are considered to be vertical search engines—i.e. search engines dedicated to a particular topic of search—such as Momondo™, a search engine dedicated to searching flights.

Regardless which search engine is used, the search engine is generally configured to receive a search query from a user, to perform a search and to return a ranked search engine results page (SERP) to the user. Factors generally used in the ranking of web pages include relevance to the words (i.e. keywords) in the search query, among a myriad of others.

That being said, mistypes in search queries that are submitted to search engines often make it difficult to conduct proper searches and to provide relevant search results in response.

Generally speaking, a mistype can be broadly categorized into two types of mistypes. Firstly, there are mistypes that are generated due to wrong key inputs. For example, instead of typing the word "patent", the user has inputted the word "oatent" due to the proximity of the keys "p" and "o". This type of mistype often occurs on mobile devices because the user interfaces on mobile devices are extremely limited and users tend to inadvertently press the wrong key due to the small size and proximity of the keys.

Secondly, there are mistypes that are generated due to the wrong keyboard layout. For example, there are different computer keyboard layouts that on a first hand appear to share the same character sets. For instance, standard "QWERTY" keyboard can be used for most Latin languages, while variants like the Canadian French "QWERTY" keyboard are also available. Moreover, there exists several keyboard layouts for the same language, such as Russian, where there is the "JCUKEN" keyboard and the Russian phonetic (also called homophonic or transliterated) keyboard layout. Indeed, it is not uncommon to see an electronic device that is configured to receive inputs in different keyboard layouts, which results in the user inadvertently typing in the search query in the wrong keyboard layout, thereby creating a mistyped word.

Generally speaking, there exist several computer-based approaches at correcting the mistyped word within the search query by the search engine. For example, a simple approach is to build a database of mistyped words and their corresponding correctly typed words. However, such an approach requires an enormous amount of computational resources to build the database.

US 2010/0050074 (published Feb. 25, 2010) discloses a method for correcting a short text message comprising the steps of: creating a table of common words and misspellings; identifying keypad used for sending the message, examining message for comprehensibility; identifying most likely error, substituting symbols based on a hierarchical system of shared keys followed by adjacent keys to hypothesize correction of the most likely error; examining hypothesized correction for comprehensibility, and repeating steps (c) to (f) until an understandable message is generated.

US Patent Publication No. 2010/125725 (published May 20, 2010) discloses a method, system and computer program product for keyboard layout detection resulting in improving the quality of the spelling suggestions, and in another aspect, recognizing a keyboard mapping mismatch between a computer and a given remote user based on a defined finite dictionary. There is no extra Application Programming Interface (API) required to pass information between the text editor and a spellchecking engine in order to perform keyboard layout detection.

US Patent Publication No. 2010/259561 (published Oct. 14, 2010) discloses methods and systems that enable defining customized virtual keyboards on a touch-sensitive surface, such as a touchscreen. Using learning algorithms, a computing device may learn the typing patterns of a user and "morph" the keys of a virtual keyboard into locations, sizes and orientations that are comfortable for the user and which may reduce typing errors. A user may create a custom keypad layout by performing a series of key strokes on a touch-sensitive surface. The computing device may correlate the touch locations to particular keys and generate keypad layout data that can be used to display the virtual keyboard and interpret touches on the touch-sensitive surface. The computing device may monitor user typing activity and refine the keypad layout data based on detected or corrected typing errors. Keypad layout data may be exported to other devices to enable users to take their virtual keyboards with them.

U.S. Pat. No. 5,956,739 (published Sep. 21, 1999) discloses a system for correcting user's mistakes including context-sensitive spelling errors and the like in which an adaptive correction algorithm is utilized which is trained on not only a conventional training corpus, but also on the text which is being corrected, thus to permit the correction of words based on the particular usages of the words in the text being corrected, taking advantage of the fact that the text to be corrected is by and large already mostly correct.

SUMMARY

It is an object of the present technology to provide improved method and systems for correcting a mistyped word. As such, the present technology aims at correcting mistyped word resulting from at least one of an inaccurate keyboard input and a wrong keyboard layout, thus improving energy consumption and decreasing computational burden on the servers associated with the search engine.

In developing the present technology, developers noted that it is possible to create a machine learning algorithm (MLA) to correct a mistyped word regardless of the cause of the mistype, provided that it is trained on a proper training data.

Without wishing to be bound to any specific theory, embodiments of the present technology have been developed based on an assumption that by artificially creating reformulations of words, these reformulations can be used to train the above MLA. At least some non-limiting embodiments of the present technology are directed to generation of "realistic mistypes" that can be used for training the MLA. The realistic mistype is one that is more likely to be made by a user when typing in a search request or the like. These reformulations are based on a corpus of text comprising words. In some embodiments of the present technology, the corpus of text can be prior search queries submitted by various users. Using these reformulations, the MLA is trained to rank and select the reformulated word that is a correctly typed word.

According to a broad aspect of the present technology, there is provided a computer implemented method for correcting a mistyped word resulting from at least one of an inaccurate keyboard input and a wrong keyboard layout, the method executable by a server. At a training phase, the method comprises: acquiring a first word from a corpus of text; selecting a first n-characters of the first word; selecting a first set of candidate characters for the first n-characters, each candidate character of the first set of candidate characters being a possible subsequent character to the first n-characters; assigning a candidate score value for each candidate character of the first set of candidate characters, the candidate score value being representative of a likelihood of a given candidate character of the first set of candidate characters to he a subsequent character to the first n-characters, the likelihood being determined based at least on a co-occurrence of the first n-characters and the given candidate character in the corpus of text; selecting a first predetermined number of top candidate characters based on their respective candidate score value, the predetermined number of top candidate characters forming a first subset of the first set of candidate characters; selecting a second subset of the first set of candidate characters, the second subset comprising candidate characters not included in the first subset of candidate characters; generating, for each of the candidate characters within the first subset of the first set, a respective positive reformulated word, the positive reformulated word corresponding to the first word having replaced at least the n+1 character with the respective candidate character from the first subset, each of the positive reformulated words and the first word forming a positive training pair with a first label value; generating, for each of the candidate characters within the second subset of the first set, a respective negative reformulated word, the negative reformulated word corresponding to the first word having replaced at least the n+1 character with the respective candidate character from the second subset, each of the negative reformulated words and the first word forming a negative training pair with a second label value, the positive training pairs and the negative training pairs forming training pairs, and each of the negative and positive reformulated words being a training word; training a machine learning algorithm (MLA), the training comprising: determining, for each training pairs, a set of features representative of a property of the training pairs; and based on the set of features associated with each training pairs, ranking the training pairs, a top ranked training pair being indicative of an absence of a mistype within the associated training word.

In some embodiments of the method, the method further comprises at an in-use phase: acquiring a text phrase for processing from a client device, the text phrase comprising at least a second word; selecting the first n-characters of the second word; selecting a second set of candidate characters, each candidate character of the second set of candidate characters being a possible subsequent character to the first n-characters of the second word; determining the candidate score value for each candidate characters of the second set; selecting a second predetermined number of top candidate characters based on their respective candidate score value; generating, for each of the second predetermined number of top candidate characters, a respective candidate word, the candidate word corresponding to the second word having replaced at least the n+1 character with the respective second predetermined number of top candidate characters, each of the candidate words and the second word forming a candidate word pair; ranking each of the candidate word pair using the MLA, to determine the top ranked candidate word pair; generating a modified text phrase, the modified text phrase corresponding to the text phrase having replaced the second word with the candidate word associated with the top ranked candidate word pair.

In some embodiments of the method, assigning the candidate score value for the given candidate character comprises determining a co-occurrence score value by determining a set of words having the same first n-characters from the corpus of text; and determining a frequency of each candidate character of the first set of candidate characters co-occurring within the set of words after the first-n characters.

In some embodiments of the method, assigning the candidate score value for the given candidate character further comprises determining a penalty score value of the given candidate character, the penalty score value being indicative of an unlikeliness of the given candidate character being a subsequent character to the first n-characters of the first word; and adjusting the previously determined co-occurrence score value with the penalty score value.

In some embodiments of the method, assigning the penalty score value comprises selecting a default keyboard layout; and assigning the penalty score value of the given candidate character comprises: determining a presence of a first keyboard key associated with the given candidate character in the default keyboard layout; upon determining the presence of the second keyboard key in the default keyboard layout; determining a location of the first keyboard key within the default keyboard layout; determining a location of a second key associated with the n+1 character of the first word in the default keyboard layout; determining a distance between the first keyboard key and the second keyboard key; assigning the penalty score value based on the determined distance; and upon determining that the that the first keyboard key is not present within the default keyboard layout, assigning a constant value to the given candidate character as the penalty score value.

In some embodiments of the method, the server is coupled to a plurality of client devices via a communication network; a search log database, the search log database comprising previously submitted search queries from the plurality of client devices; and the corpus of text is the previously submitted search queries.

In some embodiments of the method, the server is further coupled to a crawler database, the crawler database comprising one or more indications of uniform resource locators (URLs) associated with web resources. The search log database further comprises: a plurality of search engine result pages (SERPs) generated in response to the previously submitted search queries; one or more user interactions received by one or more client devices with the plurality of SERPs, the one or more user interactions comprising at least a presence of a user selecting a suggested search query from a given SERP generated in response to a given search query. The set of features of a training pair comprises at least one of: a uniform resource locator (URL) feature, the URL feature being associated with a presence of the given training word and the first word in the URLs stored within the crawler database; a word presence feature, the word presence feature being associated with a presence of the given training word and the first word in at least one web resource accessed using the URLs stored within the crawler database; and a user-click feature, the user-click feature being associated with a frequency of the user selecting the suggested search query corresponding to the given training word in response to the user having entered the first word as the search query.

In some embodiments of the method, selecting the first word from the previously submitted search queries comprises: selecting the first word from a pool of a predetermined correctly typed previously submitted search queries, the pre-determination having been executed by an assessor.

In another broad aspect of the present technology, there is provided a computer implemented method for correcting a mistyped word resulting from at least one of an inaccurate keyboard input and a wrong keyboard layout. The method is executable by a server, and comprises: acquiring a text phrase for processing from a client device, the text phrase comprising at least a first word; selecting a first n-characters of the first word; selecting a first set of candidate characters, each candidate character of the first set of candidate characters being a possible subsequent character to the first n-characters of the first word; assigning a candidate score value for each candidate character of the first set of candidate characters, the candidate score value being representative of a likelihood of a given candidate character of the first set of candidate characters to be a subsequent character to the first n-characters, the likelihood being determined based at least on a co-occurrence of the first n-characters and the given candidate character on the search queries contained in a corpus of text; selecting a predetermined number of top candidate characters based on their respective candidate score value, the predetermined number of top candidate characters forming a first subset of the first set of candidate characters; generating, for each predetermined number of top candidate characters, a respective candidate word, the candidate word corresponding to the first word having replaced at least the n+1 character with a respective predetermined number of top candidate characters, each of the candidate words and the first word forming a candidate word pair; determining, for each candidate word pairs, a set of features representative of a property of the candidate word pair; ranking each of the candidate word pair, based on the associated set of features, using a MLA to determine the top ranked candidate word pair; generating a modified text phrase, the modified text phrase corresponding to the text phrase having replaced the first word with the candidate word associated with the top ranked candidate word pair.

In some embodiments of the method, assigning the candidate score value for the given candidate character comprises determining a co-occurrence score value by: determining a set of words having the same first n-characters from the corpus of text; and determining a frequency of each candidate character of the first set of candidate characters co-occurring within the set of words after the first-n characters.

In some embodiments of the method, assigning the candidate score value for the given candidate character further comprises: determining a penalty score value of the given candidate character, the penalty score value being indicative of an unlikeliness of the given candidate character being a subsequent character to the first n-characters of the first word; and adjusting the previously determined co-occurrence score value with the penalty score value.

In some embodiments of the method, assigning the penalty score value comprises selecting a default keyboard layout; and assigning the penalty score value of the given candidate character comprises: identifying a location of a first key associated with the n+1 character of the first word in the default keyboard layout; determining a presence of a location of the second keyboard key associated with the given candidate character in the default keyboard layout; determining a distance between the first keyboard key and the second keyboard key; assigning the penalty score value based on the determined distance.

In some embodiments of the method, upon determining that the second keyboard key is not present on the default keyboard layout, assigning a constant value to the given candidate character as the penalty score value.

In some embodiments of the method, wherein the server is coupled to: a plurality of client devices via a communication network; a search log database, the search log database comprising previously submitted search queries from the plurality of client devices; and the corpus of text is the previously submitted search queries.

In some embodiments of the method, the server is further coupled to: a crawler database, the crawler database comprising one or more indications of uniform resource locators (URLs) associated with web resources. The search log database further comprises: a plurality of search engine result pages (SERPs) generated in response to the previously submitted search queries; one or more user interactions received by one or more client devices with the plurality of SERPs, the one or more user interactions comprising at least a presence of a user selecting a suggested search query from a given SERP generated in response to a given search query. The set of features of a candidate word pair comprises at least one of: a uniform resource locator (URL) feature, the URL feature being associated with a presence of a given candidate word and the first word in the URLs stored within the crawler database; a word presence feature, the word presence feature being associated with a presence of the given candidate word and the first word in at least one web resource accessed using the URLs stored within the crawler database; and a user-click feature, the user-click feature being associated with a frequency of the user selecting the suggested search query corresponding to the candidate training word in response to the user having entered the first word as the search query.

In some embodiments of the method, the first word is a mistyped word; and the candidate word associated with the top ranked candidate word pair is a correctly spelled second word.

In some embodiments of the method, the first word is a correctly spelled word; and the candidate word associated with the top ranked candidate word pair is the second word.

In some embodiments of the method, the server comprises a search engine service; the text phrase is a search query; and processing the modified text phrase comprises one of: sending the modified text phrase to the client device as a suggested search query; and executing a web search using the modified text phrase.

In another broad aspect of the present technology, there is provided a server for correcting a mistyped word resulting from at least one of an inaccurate keyboard input and a wrong keyboard layout, the server comprising a processor configured to, during a training phase: acquire a first word from a corpus of text; select a first n-characters of the first word; select a first set of candidate characters for the first n-characters each candidate character of the first set of candidate characters being a possible subsequent character to the first n-characters; assign a candidate score value for each candidate character of the first set of candidate characters, the candidate score value being representative of a likelihood of a given candidate character of the first set of candidate characters to be a subsequent character to the first n-characters, the likelihood being determined based at least on a co-occurrence of the first n-characters and the given candidate character in the corpus of text; select a first predetermined number of top candidate characters based on their respective candidate score value, the first predetermined number of top candidate characters forming a first subset of the first set of candidate characters; select a second subset of the first set of candidate characters, the second subset comprising candidate characters not included in the first subset of candidate characters; generate, for each of the candidate characters within the first subset of the first set, a respective positive reformulated word, the positive reformulated word corresponding to the first word having replaced at least the n+1 character with the respective candidate character from the first subset, each of the positive reformulated words and the first word forming a positive training pair with a first label value; generate, for each of the candidate characters within the second subset of the first set, a respective negative reformulated word, the negative reformulated word corresponding to the first word having replaced at least the n+1 character with the respective candidate character from the second subset, each of the negative reformulated words and the first word forming a negative training pair with a second label value, the positive training pairs and the negative training pairs forming training pairs, and each of the negative and positive reformulated words being a training word; rain a machine learning algorithm (MLA), the training comprising: determine, for each training pairs, a set of features representative of a property of the training pairs; and based on the set, of features associated with each training pairs, rank the training pairs, a top ranked training pair being indicative of an absence of a mistype within the associated training word.

In some embodiments of the server, the server further comprises a network interface for communicatively coupling to a communication network; the processor further configured to, at an in-use phase: acquire a text phrase for processing from a client device, the text phrase comprising at least a second word: select the first n-characters of the second word; select a second set of candidate characters, each candidate character of the second set of candidate characters being a possible subsequent character to the first n-characters of the second word; determine the candidate score value for each candidate characters of the second set; select a second predetermined number of top candidate characters based on their respective candidate score value; generate, for each of the second predetermined number of top candidate characters, a respective candidate word, the candidate word corresponding to the second word having replaced at least the n+1 character with the respective second predetermined number of top candidate characters, each of the candidate words and the second word forming a candidate word pair; rank each of the candidate word pair using the MLA to determine the top ranked candidate word pair; generate a modified text phrase, the modified text phrase corresponding to the text phrase having replaced the second word with the candidate word associated with the top ranked candidate word pair.

In some embodiments of the server, the server is coupled to a plurality of client devices via the communication network; a search log database, the search log database comprising previously submitted search queries from the plurality of client devices; and the corpus of text is the previously submitted search queries.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second"

server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 2 depicts two keyboards having different keyboard layouts implemented in accordance with known techniques.

FIG. 5 depicts a schematic illustration of a set of positive reformulated words and a set of negative reformulated words generated based on the search tree of FIG. 4.

DETAILED DESCRIPTION

Figure 1:
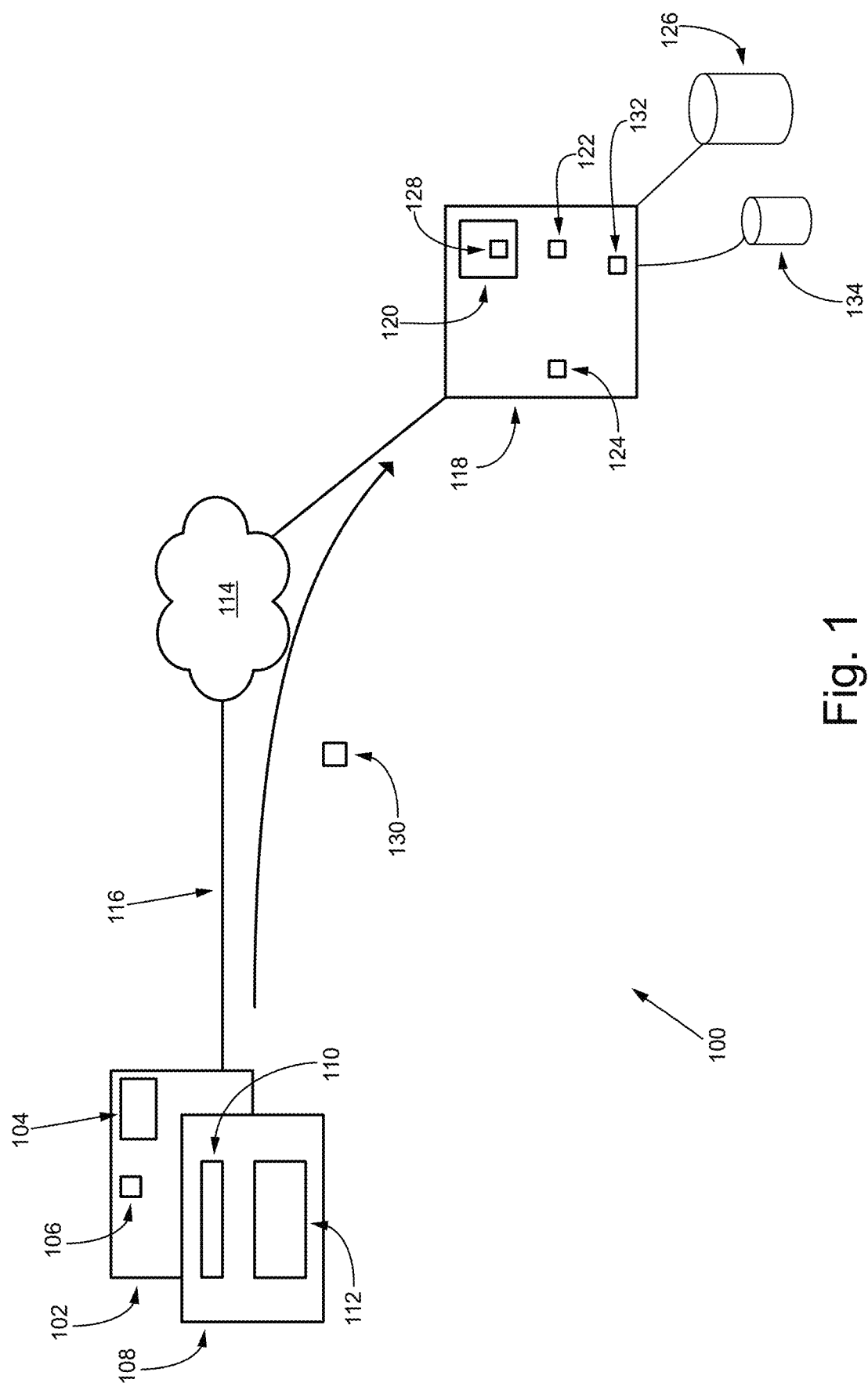
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art, to execute a search application 108. Generally speaking, the purpose of the search application 108 is to enable the user (not shown) to execute a search, such as a web search using a search engine service hosted on a server (described below). To that end, the search application 108 comprises a search query interface 110 and a search results interface 112.

How the search application 108 is implemented is not particularly limited. One example of the search application 108 may be embodied in the user (not shown) accessing a web site associated with a search engine to access the search application 108. For example, the search application 108 can be accessed by typing in a uniform resource locator (URL) associated with Yandex™ search engine at www.yandex.ru. It should be expressly understood that the search application 108 can be accessed using any other commercially available or proprietary search engine.

In alternative non-limiting embodiments of the present technology, the search application 108 may be implemented as a browser application on a portable device (such as a wireless communication device). For example, where the electronic device 102 is implemented as a portable device, such as for example, Samsung™ Galaxy™ S5, the electronic device 102 may be executing a Yandex™ browser application. It should be expressly understood that any other commercially available or proprietary browser application can be used for implementing non-limiting embodiments of the present technology.

Generally speaking, the electronic device 102 comprises a user input interface (not shown) (such as a keyboard) for receiving user inputs into, for example, the query interface 110. How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 is coupled to a communication network 114 via a communication link 116. In some non-limiting embodiments of the present technology, the communication network 114 can be implemented as the Internet. In other embodiments of the present technology, the communication network 114 can be implemented differently, such as any wide-area communications network, local-area communications network, a private communications network and the like.

How the communication link 116 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means, examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114) via the communication network 114.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments of the present technology, the server 118 can be operated by the same entity that has provided the afore-described search application 108. For example, the server 118 can be operated by Yandex LLC of Lev Tolstoy Street, No. 16, Moscow, 119021, Russia. In alternative embodiments, the server 118 can be operated by an entity different from the one providing the aforementioned search application 108.

In some embodiments of the present technology, the server 118 provides a search engine service 124 (such as Yandex Search™) which is accessible by the search application 108 via the communication network 114. The manner in which the search engine service 124 is implemented is known in the art and therefore will not be described in detail herein. Suffice to say that the search engine service 124 is configured to execute one or more web searches responsive to a "search string" entered by the user (not shown) into the query interface 110. The search engine service 124 is further configured to transmit to the electronic device 102 a set of search results, to be displayed to the user of the electronic device 102 via the search results interface 112, as a search engine result page (SERP).

As such, the server 118 is also configured to execute a crawling function to gather web resources (not shown) coupled to the communication network 114, and, to that end, comprises a crawler application 132. Although the crawler application 132 is depicted as being comprised within the server 118, in alternative embodiments, the functionality of the crawler application 132 may be distributed and may be implemented via multiple servers.

Generally speaking, the crawler application 132 is configured to periodically access web hosting servers (not shown) coupled to the communication network 114 to identify and retrieve web resources stored therein.

The crawler application 132 is connected via a first dedicated link (not numbered) to a crawler database 134. In some embodiments, an indication of the crawled web resources (such as their URLs) is indexed and stored in the crawler database 134. Moreover, the crawler database 134 also contains a record for each crawled web resources, such as the date of the last access or crawling, which may be used by the crawler application 132 to keep the crawler database 134 up-to-date. Although depicted as separate from the server 118 to which it is coupled to via the first dedicated link (not numbered), the crawler database 134 can be implemented as part of the server 118.

The server 118 is further coupled to a search log database 126 via a second dedicated link (not numbered). Broadly speaking, the search log database 126 stores the historical information collected from a large number of previously executed search queries that are submitted to the search engine service 124. Although depicted as separate from the server 118 to which it is coupled to via the second dedicated link (not numbered), the search log database 126 can be implemented as part of the server 118.

In some embodiments, the search log database 126 is configured to store the previously executed search queries, and their respective generated SERPs.

In a further embodiment, the search log database 126 is configured to store "past-query-specific data" associated with each past search query submitted to the search engine service 124. For example, the past-query-specific data may comprise the presence of a "suggested correctly typed search query" which is often shown on a top portion of the SERP in response to the search query comprising an error. The past-query-specific data may further comprise an indication of whether the user has selected the suggested correctly typed search query.

The server 118 further comprises an error correction application 128 stored within the server memory 120. As described below in more detail, the error correction application 128 comprises a set of computer executable program instructions executable by the server processor 122 for correcting a mistyped word resulting from at least one of an inaccurate keyboard input and a wrong keyboard layout.

Before advancing further on an explanation of the functions and operations of the various components of the error correction application 128, attention is briefly directed to FIG. 2, which illustrates two types of keyboard layouts, namely a first keyboard 202 and a second keyboard 204 installed on the electronic device 102.

The first keyboard 202 is a "QWERTY" keyboard commonly found in the United States and in the English-speaking part of Canada.

The second keyboard 204 is also a "QWERTY" keyboard but differs from the first keyboard 202 as it is adapted for the French language, and is commonly used by French-speaking Canadians in the province of Québec. Amongst other things, the second keyboard 204 differs from the first keyboard 202 in that the key associated with an accentuated letter "é" is replacing the key associated with the slash bar "/".

As has been alluded above, a first source of mistypes is inaccurate keyboard input, resulting often from the keyboard key proximity. Although less common for keyboards found on personal computers (desktops, laptops, netbooks, etc.), this type of mistype frequently occurs for mobile devices which features miniature keyboards with a touch-sensitive screen interface. Another source of mistypes is the wrong keyboard layout used for inputting the text. This may result, for example, where the user inadvertently presses a key in a keyboard layout different from what was intended by the user.

Just as an example, using the first keyboard 202 and the second keyboard 204, let us assume that a French Canadian user has inadvertently used the first keyboard 202 thinking it to be (by force of habit) the second keyboard 204 when trying to input the search query "Comment dessaler la morue salée" into the search query interface 110 for executing a web search using the search engine service 124.

Contrary to what was intended, the search engine service 124 has rather received the search query "Comment dessaler la morie sal/e", which contains two mistypes. Firstly, a $4^{th}$ word intended to be written as "morue" has been mistyped into "morie" due to the proximity of the "i" and "u" in the first keyboard 202. Secondly, a $5^{th}$ word indented to be written as "salée" has been mistyped into "sal/e" due to the inaccurate keyboard layout.

Conventionally, a simple approach to correct the mistyped search query like the one above was to use two approaches, namely to first determine which kind of error the mistype was (i.e. an erroneous keyboard input or an erroneous keyboard layout) and then identifying the correctly typed word. However, in developing the present technology, developers noted that by analyzing, inter alia, a corpus of text, such as the search log database 126, it is possible to use a single approach to correct the mistyped word without having to identify what kind of a mistype it is.

Figure 3:
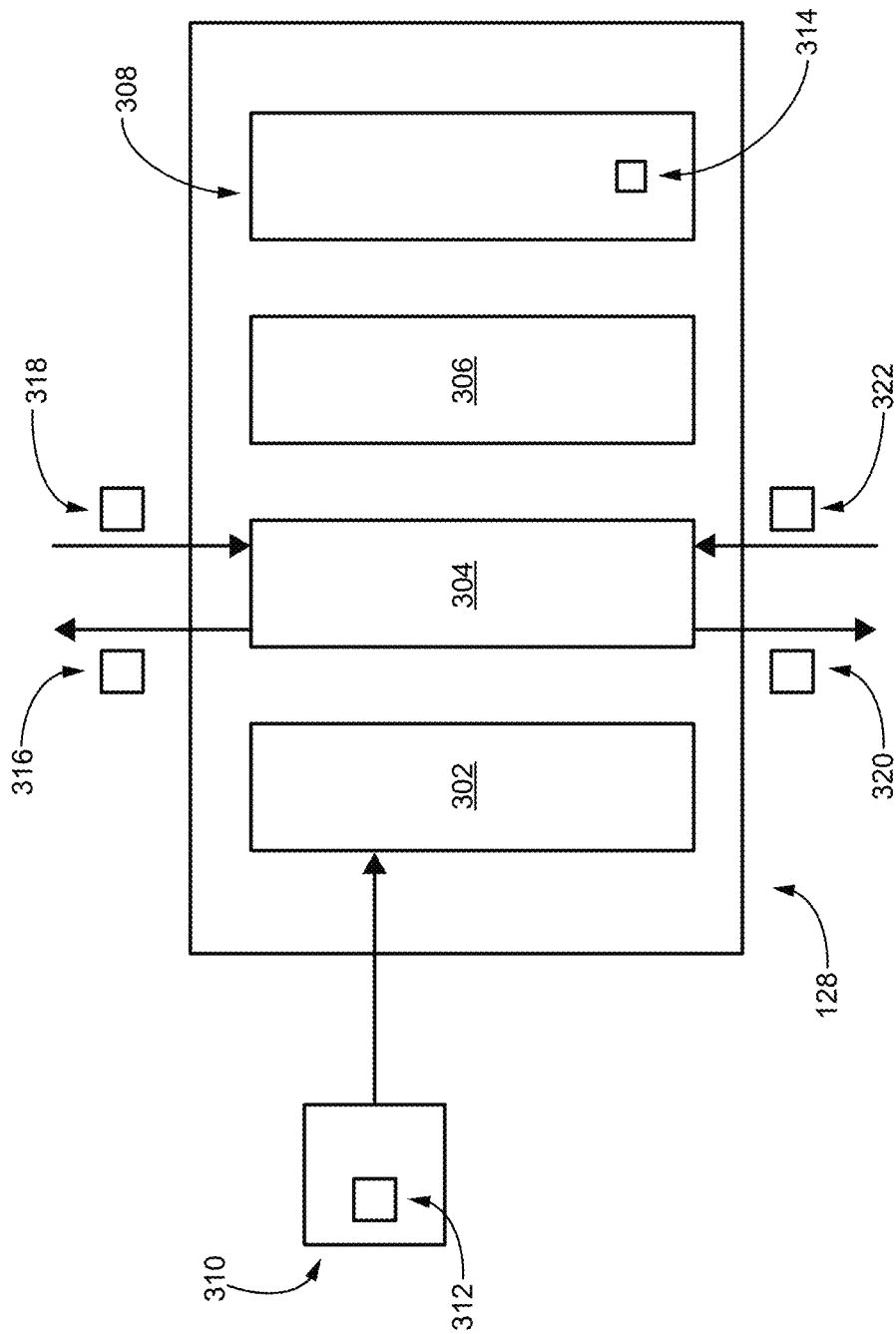
FIG. 3 depicts an example of a process of training a machine learning algorithm by the server of the system of FIG. 1.

Functions and operations of the various components of the error correction application 128 will now be described in greater details. With reference to FIG. 3, there is depicted a schematic illustration of the error correction application 128 for correcting a mistyped word resulting from at least one of an inaccurate keyboard input and a wrong keyboard layout. The error correction application 128 executes (or otherwise has access to): a word acquisition routine 302, a candidate score generation routine 304, a reformulated word generation routine 306, and a word correction routine 308.

In the context of the present specification, the term "routine" refers to a subset of the computer executable program instructions of the error correction application 128 that is executable by the server processor 122 to perform the functions explained below. For the avoidance of any doubt, it should be expressly understood that the word acquisition routine 302, the candidate score generation routine 304, the reformulated word generation routine 306, and the word correction routine 308 are illustrated schematically herein in a separate and distributed manner for ease of explanation of the processes executed by the error correction application 128. It is contemplated that some or all of the word acquisition routine 302, the candidate score generation routine 304, the reformulated word generation routine 306, and the word correction routine 308 may be implemented as one or more combined routines.

For ease of understanding the present technology, functionalities of each one of the word acquisition routine 302, the candidate score generation routine 304, the reformulated word generation routine 306, and the word correction routine 308, as well as data and/or information processed or stored therein during a pre-in-use phase of the error correction application 128 are described below. An in-use phase description of the error correction application 128 will follow.

Pre-In-Use Phase (Training Phase)

As it will be discussed below in more details, the error correction application 128 comprises a machine learning algorithm (MLA) 314 that is part of the word correction routine 308. The manner in which the MLA 314 is trained will be described below.

For understanding the underlying concepts of the present technology, it should be understood that the training of the MLA 314 can be broadly separated into a first phase and a second phase. In the first phase (executed by the word acquisition routine 302, the candidate score generation routine 304 and the reformulated word generation routine 306), training data (discussed below) for training the MLA 314 is generated. In the second phase, the MLA 314 is trained using the training data.

Receiving a Search Query

The word acquisition routine 302 is configured to receive a data packet 310. In some embodiments, the data packet 310 comprises a first word 312 received from a corpus of text, such as the search log database 126. Recalling that the search log database 126 is configured to store the previously submitted search queries, it should be understood that the first word 312 can be a word that has been previously inputted by a given user. As such, it may happen that the first word 312 is one of a mistyped word or a correctly typed word. In some embodiments of the present technology, the corpus of text can be used "as is", i.e. with both correctly typed words and mistypes (or even mis-spells). Needless to say, it is contemplated that an operator (not shown) associated with the error correction application 128 may select a correctly typed word from the search log database 126 as the first word 312 and discard the mistyped/mis-spelled words.

Although the word acquisition routine 302 has been described as receiving the data packet 310 from the search log database 126, it is not limited as such, and may for example be received from a different corpus of text, such as from a web resource, a dictionary, and the like.

Upon receiving the data packet 310, the word acquisition routine 302 is configured to select a first n-characters 402 (explained with reference to FIG. 4 below) of the first word 312. For example, the word acquisition routine 302 may be configured to select the first 2 characters of the first word 312. Thus, if the first word 312 is "apple", the word acquisition routine 302 selects the characters "ap". Needless to say, the word acquisition routine 302 may select more or less than the first 2 characters.

Generating a Candidate Score Value

Figure 4:
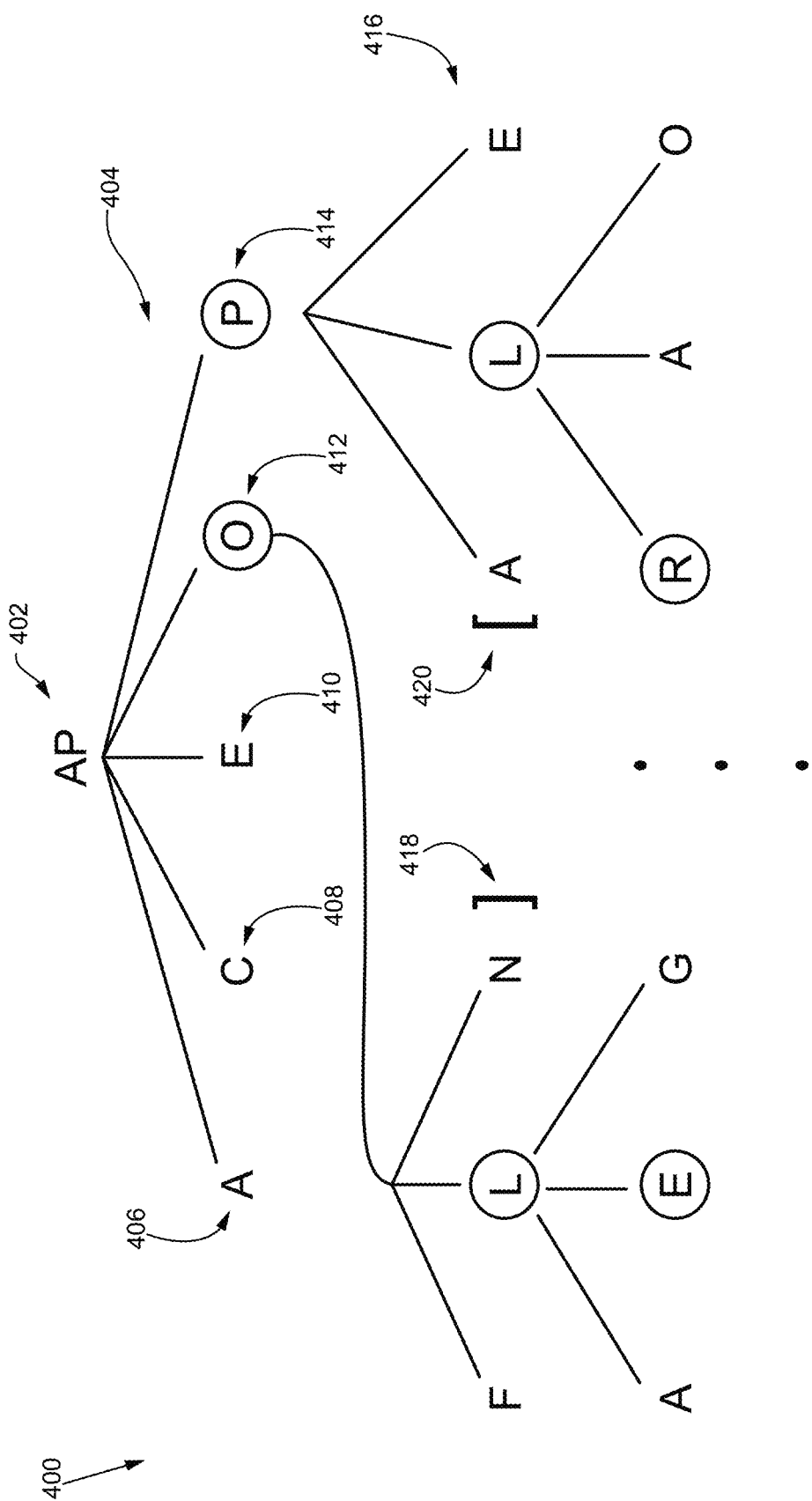
FIG. 4 depicts a schematic illustration showing structure and components of a search tree generated for training the machine learning algorithm of FIG. 3.

Reference is now made to FIG. 4, where upon selecting the first n-characters 402, the candidate score generation routine 304 is configured to build a search tree 400. At a root of the search tree 400, there is provided the first n-characters 402. At a first level of the search tree 400, the candidate score generation routine 304 selects a first set of candidate characters 404, where each of the candidate characters of the first set of candidate characters 404 is a possible subsequent character to the first n-characters 402 (i.e. a successor to a state of the root represented by the first n-characters 402). The manner in which the candidate score generation routine 304 selects the candidate characters of the first set of candidate characters 404 is not limited, and may (for example) select all the letters of a given alphabet (such as the Latin alphabet, the Cyrillic alphabet), select a combination of letters from different alphabets, select a combination of letters (from one or more alphabets) and punctuation marks, or select a pre-determined number of characters near the key associated with the character following the first n-characters 402 in one or more keyboard layouts. In a specific non-limiting embodiment of the present technology, the candidate score generation routine 302 selects the candidate characters from a pre-determined first alphabet and a pre-determined second alphabet. In another specific non-limiting embodiment of the present technology, the candidate score generation routine 302 selects the candidate characters from a pre-determined first keyboard layout of the given alphabet and a pre-determined second keyboard layout of the same alphabet.

Based on the first n-characters 402 and the first set of candidate characters 404, the candidate score generation routine 304 is configured to assign a candidate score value for each candidate character of the first set of candidate characters 404. In some embodiments, the candidate score value is representative of the likelihood of a given candidate character of the first set of candidate characters 404 to be a subsequent character to the first n-characters 402 based at least on an analysis of the corpus of text, such as the search log database 126. The manner in which the candidate score value is implemented is not limited, and may for example be implemented as a percentage value, or a value between a scale of 1 to 10, or any other numerical ranges.

As illustrated, the first n-characters 402 in the example used herein is "ap", and the first set of candidate characters 404 comprises 5 candidate characters, namely a first candidate character 406, a second candidate character 408, a third candidate character 410, a fourth candidate character 412, and a fifth candidate character 414. Needless to say, the first set of candidate characters 404 may include more or less candidate characters and some other characters from a different language (such as Cyrillic characters), and/or punctuation marks.

The candidate score value is determined based on at least a co-occurrence score value. In some embodiments, the co-occurrence score value represents the likelihood a given candidate character being the subsequent character to the first n-characters 402 based on a co-occurrence of the first n-characters 402 and the given candidate character in the corpus of text, such as the previously executed search queries stored within the search log database 126. In other words, the candidate score generation routine 304 is configured to determine the likelihood of the given character being a subsequent character to the first n-characters 402 based on the previously submitted search queries stored within the search log database 126. Needless to say, the co-occurrence score value may be determined based on the co-occurrence of the first n-characters 402 and the given candidate character in a different corpus of text, such as, but not limited to, a dictionary. The manner in which the co-occurrence score value is implemented is not limited, and may for example be implemented as a percentage value, or a value between a scale of 1 to 10, or any other numerical ranges.

The manner in which the co-occurrence score is assigned will now be described. Briefly returning to FIG. 3, the candidate score generation routine 304 is configured to transmit a data packet 316 a database (not shown) hosting a corpus of text, such as the search log database 126. The data packet 316 contains an indication of the first n-characters 402 as well as a request for words contained in the search log database 126 that shares the same first n-characters 402, and their respective frequencies of occurrence within the search log database 126.

In some embodiments, the data packet 316 further contains an instruction for limiting the requested words to have a same number of characters as the first word 312. Thus, following with the example above, if the first word 312 is "apple", the data packet 316 may include an indication of the first 2 characters "ap", and a request for words stored in the search log database 126 that also begins with the characters "ap" that has the same number of characters as "apple" (i.e. 5 characters) and their frequencies of occurrence within the search log database 126.

In response, the search log database 126 transmits a data packet 318 to the candidate score generation routine 304, which contains a set of words having the same first n-characters 402 and an indication of the frequency of occurrence for each word included therein.

Upon receiving the data packet 318, the candidate score generation routine 304 assigns the co-occurrence score value to each of the candidate characters within the first set of candidate characters 404, such that a given candidate character that often follows the first n-characters 402 will be assigned a higher co-occurrence score value, whereas the candidate characters that less often follows the first n-characters 402 will be assigned a lower co-occurrence score value.

In developing the present technology, developers noted that some candidate characters that frequently occur as a subsequent character to the first n-characters 402 incorrectly emphasize its candidate score value if it were to be based solely on the co-occurrence score value. Indeed, since the underlying principle of this step is to identifying candidate characters that would likely be erroneously inputted (either by an inaccurate keyboard input and/or a wrong keyboard layout) instead of the intended character by the user, there is a need to adjust the co-occurrence score value. Hence, in some embodiments, a penalty score value is determined, which adjusts the co-occurrence score value.

In some embodiments, the penalty score value represents an unlikeliness of the given candidate character being the subsequent character to the first n-characters 402. The manner in which the penalty score value is implemented is not limited, and may for example be implemented as a percentage value, or a value between a scale of 1 to 10, or any other numerical ranges.

In some embodiments, the penalty score value is one of a first penalty score value and a second penalty score value (described below). The first penalty score value corresponds to the unlikeliness of the given candidate character being the subsequent character to the first n-characters 402 in a given keyboard layout.

The manner in which the first penalty score value is determined will now be described. The candidate score generation routine 304 is configured to select a default keyboard layout. The default keyboard layout can be selected based on the location of the service provided by the search engine service 124. For example, if the search engine service 124 provides its service in the United States of America, the default keyboard layout will correspond to the first keyboard 202 (see FIG. 2).

Recalling that the first word 312 is "apple", the candidate score generation routine 304 is configured to determine the character that corresponds to the n+1 character of the first word 312 (in this example, it is "p"). The candidate score generation routine 304 is further configured to locate a position of a keyboard key 212 associated with the letter "p". The candidate score generation routine 304 is then configured to associate a respective first penalty score value to each of the candidate characters (which comprises the first set of candidate characters 404), based on a distance between the given character key and the keyboard key 212.

For example, in assigning the candidate score value to the first candidate character 406 ("a") and the fourth candidate character 412 ("o"), the candidate score generation routine 304 will assign a higher first penalty score value to the first candidate character 406, and a lower first penalty score value to the fourth candidate character 412 because the candidate character "o" is closer to the keyboard key 212 than the candidate character "a" in the first keyboard 202.

In some embodiments, where the given candidate character does not appear on the default keyboard layout (i.e. the first keyboard 202), the candidate score generation routine 304 is configured to assign the second penalty score value to the given candidate character. For example, if instead of "a", the first candidate character 406 was "é" (which is not present on the first keyboard 202), the candidate score generation routine 304 is configured to assign the second penalty score value. In some embodiments, the second penalty score value is the same for each candidate characters that are not found within the default keyboard.

Returning to FIG. 4, the candidate score generation routine 304 assigns the candidate score value for each characters of the first set of candidate characters 404 based on the previously determined co-occurrence score value and the penalty score value. In some embodiments, the candidate score value corresponds to the co-occurrence score value deducting the penalty score value.

The candidate score generation routine 304 is further configured to determine the first predetermined number of top candidate characters that have the highest candidate score value. For example, the candidate score generation routine 304 is configured to select the 2 candidate characters that have the highest candidate score value. Needless to say, the candidate score generation routine 304 can be configured to select more or less than 2 candidate characters that have the highest candidate score value.

As an example, it is determined that the fourth candidate character 412 and the fifth candidate character 414 are the top 2 candidate characters with the highest candidate score value. As such, the search tree 400 expands a second level with regards to the fourth candidate character 412 and the fifth candidate character 414 only. In other words, the first candidate character 406, the second candidate character 408 and the third candidate character 410 are discarded.

The second level of the search tree 400 comprises a second set of candidate characters 416. The second set of candidate characters 416 comprises a first subset 418 that comprises possible characters that follows the first n-characters 402 and the fourth candidate character 412 (i.e. "apo"), and a second subset 420 that comprises possible characters that follows the first n-characters 402 and the fifth candidate character 414 (i.e. "app"). The manner in which the candidate characters within the second set of candidate characters 416 are selected is not limited and may be done in a similar manner to which the candidate characters of the first set of candidate characters 404 are selected. Needless to say, the second set of candidate characters 416 may include more or less candidate characters and some other characters from a different language (such as Cyrillic characters), and/or punctuation marks.

The candidate score generation routine 304 is then configured to assign the candidate score value to each candidate characters forming the second set of candidate characters 416.

Taking the first subset 418 as an example, the candidate score generation routine 304 is configured to transmit a data packet 320 to the database hosting the corpus of text, (in the present example, corresponding to the search log database 126) (see FIG. 3). The data packet 320 contains an indication of the first n-characters and the fourth candidate character 412 (i.e. "apo"), as well as a request for words contained in the search log database 126 that shares the same first 3 characters as "apo", and their respective frequencies of occurrence within the search log database 126. In some embodiments, the data packet 320 further contains an instruction for limiting the requested words to have a same number of characters as the first word 312. Thus, following with the example above, if the first word 312 is "apple", the data packet 320 may include an indication of the characters "apo", and a request for words stored in the search log database 126 that also begins with the characters "apo" that has the same number of characters as "apple" (i.e. 5 characters) and their frequencies of occurrence within the search log database 126.

In response, the search log database 126 transmits a data packet 322 to the candidate score generation routine 304, which contains a set of words having the same 3 characters and an indication of the frequency of occurrence for each word included therein.

Upon receiving the data packet 322, the candidate score generation routine 304 assigns the co-occurrence score value to each of the candidate characters within the first subset 418, in the manner described above.

The manner in which the candidate score generation routine 304 assigns the penalty score value has been described above and will not be described in detail herein. However, suffice to say that the first penalty score value for a given candidate character is determined based on a distance of the key associated with the fourth character of the first word 312 (i.e. "L") and the given candidate character.

Having determined the candidate score value for each of the candidate characters in the second set of candidate characters 416, the candidate score generation routine 304 is configured to again select the first predetermined number of top candidate characters that have the highest candidate score value within the second set of candidate characters 416 (i.e. within the second level of the search tree 400). For example, the candidate score generation routine 304 is configured to select the 2 candidate characters that have the highest candidate score value. Needless to say, the candidate score generation routine 304 can be configured to select more or less than 2 candidate characters that have the highest candidate score value. As an example, it is determined that the candidate character "L" from the first subset 418 and the candidate character "L" from the second subset 420 are the top 2 candidate characters with the highest candidate score value within the second set of candidate characters 416. As such, the search tree 400 expands a third level with regards to these candidate characters only, and the remaining candidate characters are discarded.

The candidate score generation routine 304 is configured to iteratively build the search tree 400 up to the nth-level which comprises candidate characters for the last character of the first word 312. As such, in the present example, the candidate score generation routine 304 is configured to build a three level search tree.

It should be understood that although the candidate score generation routine 304 has been described as being configured to transmit and receive different data packets (such as the data packets 316, 318, 320, and 322) this is done for ease of explanation. Needless to say, it is also contemplated that the all the required data for building the search tree 400 is received within the data packet 310 and therefore there would be no need for the candidate score generation routine 304 to communicate with the database hosting the corpus of text, such as the search log database 126, when building the search tree 400.

Creating Reformulated Words

Once the search tree 400 has been generated, the sequences of candidate characters from the root to a last level are used to generate a set of positive reformulated words 502 (see FIG. 5). Recalling that only two candidate characters are selected to expand a level, the set of positive reformulated words 502 comprises two reformulated words, namely a first positive reformulated word 504 corresponding to "apole" and a second positive reformulated word 506 corresponding to "applr".

Needless to say, although only two positive reformulated words are illustrated to be part of the set of positive reformulated words 502, this is done merely for ease of reference, and it should be noted that it is not intended to be limitative. Indeed, since the number of reformulated words that can be generated are based on the number of candidate characters being selected to expand the level, it should be understood that an operator of the error correction application 128 may increase or decrease the amount of generated positive reformulated words by altering the number of candidate characters being selected to expand the subsequent level while generating the search tree 400.

In some embodiments, the search tree 400 is built using a "beam search" technique, which is configured to generate positive reformulated words that correspond to the first word 312 or to a likely mistyped word of the first word 312. Since the beam search is executed on the data contained within the search log database 126 and on an analysis of the keyboard layouts, the resulting positive reformulated words (other than the one that is correctly typed) can be considered to be likely mistyped words of the first word 312 resulting from at least one of an inaccurate keyboard input and a wrong keyboard layout.

Moreover, since the search tree 400 keeps only a predetermined number of the higher ranked candidate characters at each level and the rest are discarded, the error correction application 128 is configured to use a limited amount of the server memory 120 in generating the positive reformulated words.

In some embodiments, the reformulated word generation routine 306 is further configured to select one or more candidate characters within the search tree 400 that has been discarded (such as the first candidate character 406), to generate a set of negative reformulated words 508.

As such the reformulated word generation routine 306 is configured to select a number of candidate characters at least from each level of the search tree 400 that has been discarded, to generate a negative reformulated word.

In some embodiments, the reformulated word generation routine 306 is configured to select the first candidate character 406 from the first set of candidate characters 404 (corresponding to the first level of the search tree 400) to generate a first negative reformulated word 510 by replacing the character subsequent to the first n-characters 402 of the first word 312 with the first candidate character 406 (thus, generating "apale").

In some embodiments, the reformulated word generation routine 306 is configured to select a discarded candidate character from the second set of candidate characters 406 to generate a second negative reformulated word 512 by replacing the fourth character of the first word 312 (corresponding to the second-level character in the search tree 400) with the one discarded candidate character (thus, generating "appae").

Although only two negative reformulated words are shown in FIG. 5, this is merely done for ease of reference and it is not intended to be limitative. It is contemplated that more or less negative candidate words could be generated by the reformulated word generation routine 306.

Training the MLA 314

Figure 6:
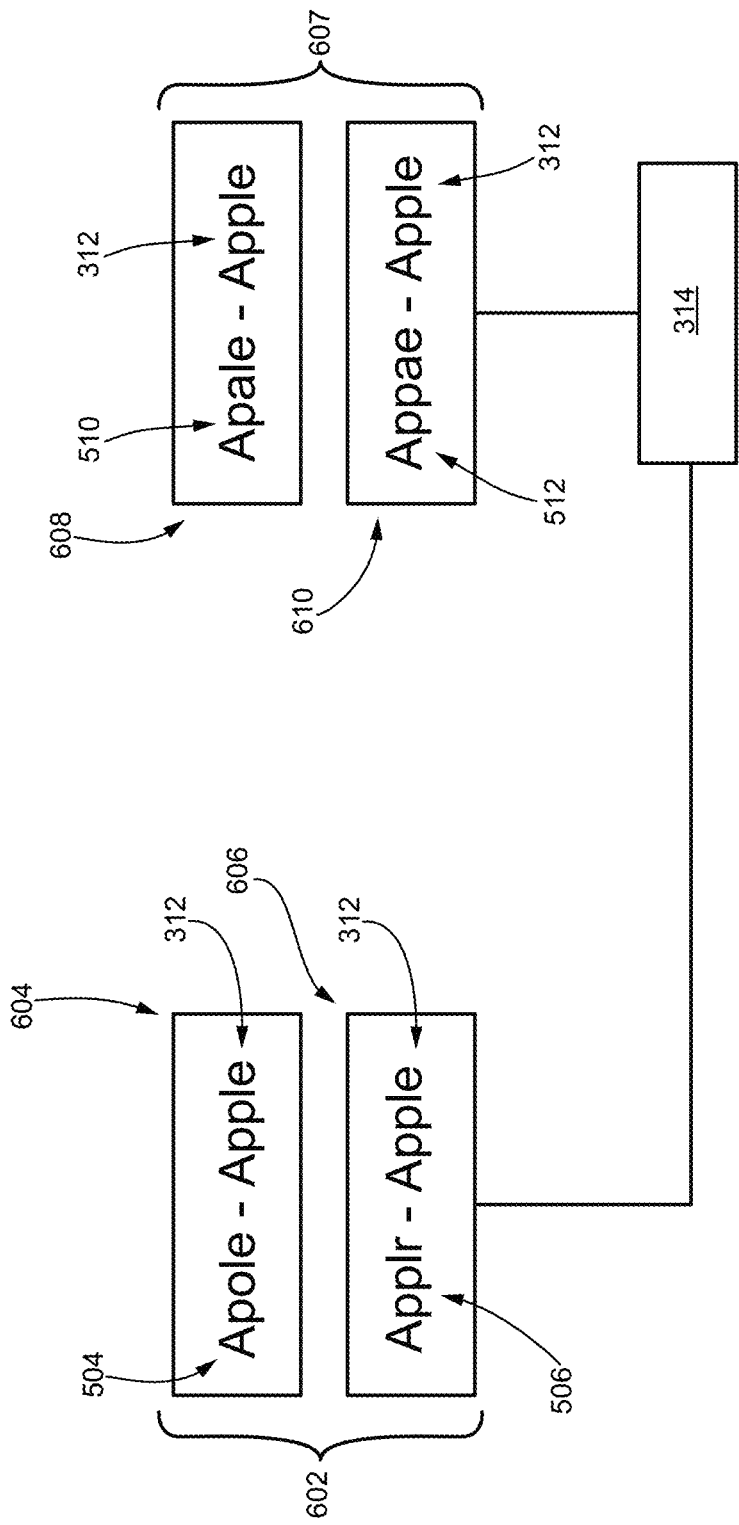
FIG. 6 depicts a schematic illustration of the training of the machine learning algorithm of FIG. 3.

Referring to FIG. 6, the word correction routine 308 is configured to generate a set of positive training pairs 602 and a set of negative training pairs 607.

The set of positive training pairs 602 comprises a first positive training pair 604, and a second positive training pair 606. The first positive training pair 604 comprises a pairing of the first positive reformulated word 504 and the first word 312. Similarly, the second positive training pair 606 comprises a pairing of the second positive reformulated word 506 with the first word 312.

The set of negative training pairs 607 comprises a first negative training pair 608 and a second negative training pair 610. The first negative training pair 608 comprises a pairing of the first negative reformulated word 510 and the first word 312. Similarly, the second negative training pair 610 comprises a pairing of the second negative reformulated word 512 and the first word 312.

The set of positive training pairs 602 and the set of negative training pairs 607 form the training pairs for training the MLA 314. It would be apparent from the following description that each of the reformulated words (for example, the first positive reformulated word 504, the second positive reformulated word 506, the first negative reformulated word 510 and the second negative reformulated word 512) can be considered as a training word.

The word correction routine 308 is configured to assign a first label value to the set of positive training pairs 602. The first label value is indicative that each of the first positive reformulated word 504 and the second positive reformulated word 506 is a likely mistyped word (i.e. a reasonable human-like mistype) of the first word 312 resulting from at least one of an inaccurate keyboard input and a wrong keyboard layout. By the same token, it can be said that the first label value is indicative of the first word 312 being the "correct" word for the mistypes represented by the first positive reformulated word 504 and the second positive reformulated word 506. Similarly, the word correction routine 308 is configured to assign a second label value to the set of negative training pairs 607. The second label value is indicative that each of the first negative reformulated word 510 and the second negative reformulated word 512 is not a likely mistyped word of the first word 312 resulting from at least one of an inaccurate keyboard input and a wrong keyboard layout. By the same token, it can be said that the second label value is indicative of the first word 312 not being the "correct" word for the mistypes represented by the first negative reformulated word 510 and the second negative reformulated word 512.

One of the benefits of this aspect is that, the automatic labelling by the word correction routine 308 prevents the set of training pairs to be labelled manually, thereby saving time and/or expense since the process of labelling is typically a time consuming process. In some embodiments, the first label value and the second label values are binary values.

The training of the MLA 314 will now be described. The word correction routine 308 is configured to input the training data (i.e. the set of positive training pairs 602 and the set of negative training pairs 607) into the MLA 314.

The MLA 314 comprises a training logic to determine a set of features for each training pair (i.e. the first positive training pair 604, the second positive training pair 606, the first negative training pair 608 and the second negative training pair 610). In some embodiments, the set of features are representative of the properties of the given training pair.

In some embodiments, the set of features computed for a given training pair may include, but is not limited to, the following:
 (i) an uniform resource locator (URL) feature, the URL feature being associated with a presence of the given training word and the first word 312 in an URL;
 (ii) a word presence feature, the word presence feature being associated with a presence of the given training word and the first word 312 in a web resource; and
 (iii) a user-click feature, the user-click feature being associated with a frequency of the user selecting the one of the given training word or the first word 312 as the suggested correct spelling on a SERP, in response to the user having entered one of the given training word or the first word 312 in the search query.

Each of the above mentioned features will now be explained in detail.

(i) an uniform resource locator (URL) feature, the URL feature being associated with a presence of the given training word and the first word 312 in an URL Recalling that the server 118 is coupled to the crawler database 134 which stores a plurality of URLs of web resources previously crawler, the URL feature is indicative of a frequency of the given training word and the first word 312 found within the URLs.

(ii) a word presence feature, the word presence feature being associated with a presence of the given training word and the first word 312 in a web resource The word presence feature is calculated based on the presence of the given training word and the first word 312 in a web resource. As such, the word presence feature is indicative of a frequency of occurrence of the given training word and the first word within a preselected at least one web resource (such as Wikipedia™).

(iii) a user-click feature, the user-click feature being associated with a frequency of the user selecting the one of the given training word or the first word 312 as the suggested correct spelling on a SERP, in response to the user having entered one of the given training word or the first word 312 in the search query Recalling that the search log database 126 stores the indications of the user selecting the suggested correct spelling in the SERP generated in response to receiving a mistyped word, the user-click feature is indicative of a frequency of the mistyped word corresponding to the first word 312 and the suggested correct spelling selected by the user to be the given training word (and vice-versa).

Once the set of features for each training pair has been determined, the MLA 314 is configured to analyze the set of features between the positive reformulated words and the first word 312, and the set of features between the negative reformulated words and the first word 312.

More precisely, recalling that each training pairs had training word that is either a likely mistype (positive examples) or an unlikely mistype (negative examples) of the first word 312, and the associated label value being indicative of the likelihood of the first word 312 being the correct word for the positive examples and not being the correct words for the negative examples, the MLA 314 is configured to learn, what set of features are indicative of making the first word 312 a likely correction for a given mistyped word. Accordingly, the MLA 314 is configured to generate an inferred function which is capable of ranking each training pairs according to the likelihood of a given word, i.e. the first word 312 (the "right side") being a likely correction of its mistype (the "left side").

Although the illustration of the training of the MLA 314 has been done using an example of only the first word 312, it should be understood that the MLA 314 is trained iteratively using a plurality of words retrieved from the corpus of text.

Now, having described the manner in which the error correction application 128 is prepared prior to the in-use phase, attention will now be turned to the in-use phase of the error correction application 128.

In-Use Phase

Figure 7:
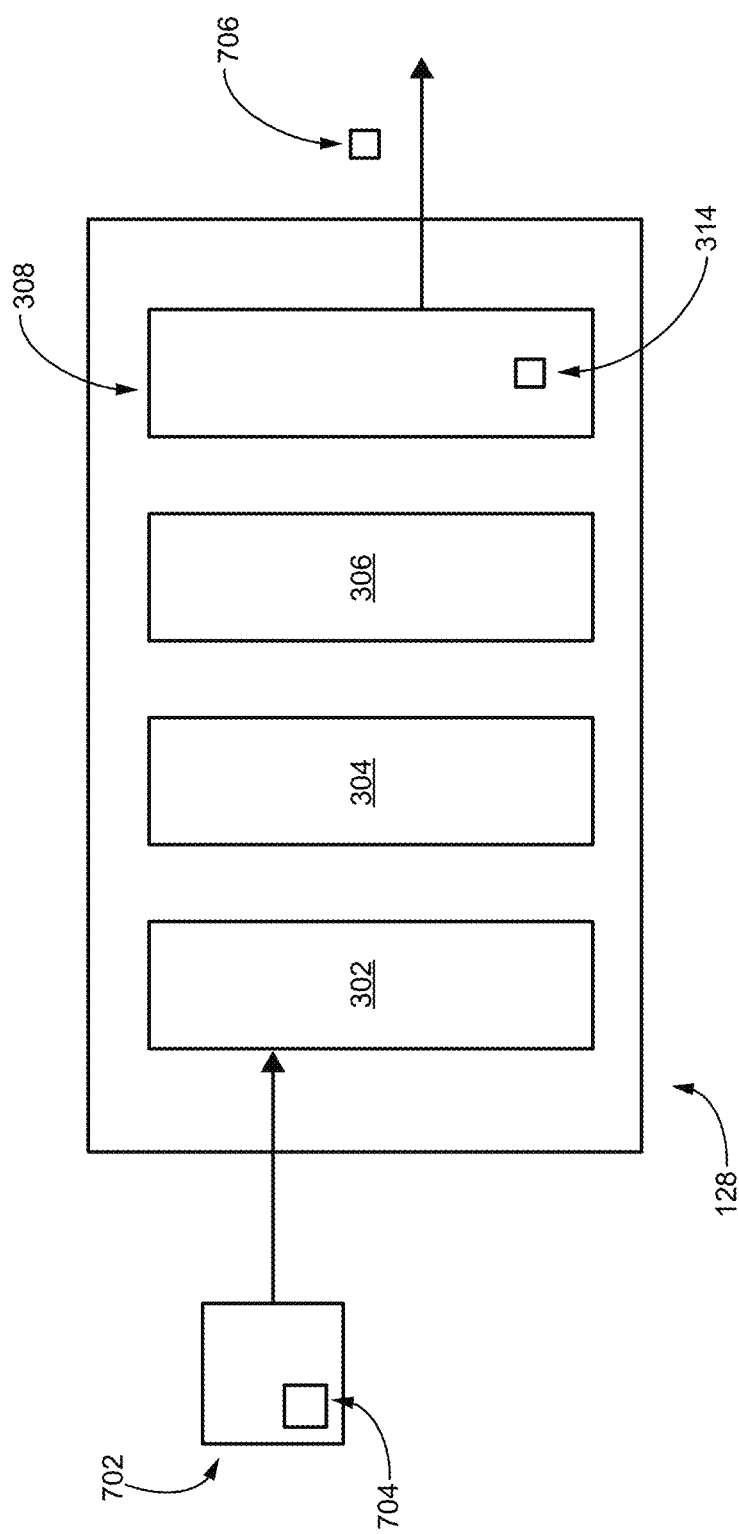
FIG. 7 depicts an example of a process for correcting a mistyped word by the server of the system of FIG. 1.

Turning now to FIG. 7, there is shown a schematic illustration of the error correction application 128 during the in-use phase. For simplicity, elements of the error correction application 128 described with regards to the training phase (with reference to FIG. 3) that are similar to those of the in-use phase have been labelled with the same reference numerals and will not be described again in detail herein.

Functionalities of each one of the word acquisition routine 302, the candidate score generation routine 304, the reformulated word generation routine 306, and the word correction routine 308, as well as data and/or information processed or stored therein during the in-use phase of the error correction application 128 are described below.

Receiving a Second Word

Briefly returning to FIG. 1, there is depicted a data packet 130 which comprises a text phrase (i.e. a search query) sent from the search application 108 of the electronic device 102, and received from the search engine service 124. In some embodiments, the text phrase comprises at least one word that is mistyped. In some embodiments, the text phrase does not contain any mistypes.

Upon receiving the data packet 130, the search engine service 124 is configured to transmit a data packet 702 to the word acquisition routine 302. In some embodiments, the search engine service 124 is configured to, before transmitting the data packet 702, parse the text string received via the data packet 130 into individual words. The manner in which the parsing is done is not limited, and may for example be done by analyzing the spacing and punctuation marks between the individual words. After parsing the text string, the search engine service 124 is configured to transmit the data packet 702 which includes a second word 704 included within the text string. In some embodiments, the data packet 702 comprises the text string, and the word acquisition routine 302 is configured to parse the text string to then select the second word 704.

The word acquisition routine 302 then selects a first n-characters of the second word 704. For example, assuming that the second word 704 is "appoe" (a mistype of "apple"), the word acquisition routine 302 selects the characters "ap".

Generating a Candidate Score Value

As in the training phase, upon selecting the first n-characters, the candidate score generation routine 304 is configured to build a search tree (not shown) which comprises a first level with a third set of candidate characters, where each of the candidate characters of the third set of characters is a possible character to the first n-characters of the second word 704. The manner in which candidate characters within the third set of candidate characters is selected is not limited and may be done in a similar manner to which the candidate characters of the first set of candidate characters 404 is selected. Needless to say, the second set of candidate characters 416 may include more or less candidate characters and some other characters from a different language (such as Cyrillic characters), and/or punctuation marks.

The candidate score generation routine 304 is further configured to assign a candidate score value to each candidate character of the third set of candidate characters. The manner in which the candidate score generation routine 304 assigns the candidate score value to each candidate character of the third set of candidate characters have been described above and will therefore not be repeated here.

The candidate score generation routine 304 is configured to select the first predetermined number of top candidate characters within the third set of candidate characters based on their candidate score value, and expand the search tree on a second level and so on, as described above.

Creating Candidate Words

The reformulated word generation routine 306 is configured to generate a set of candidate words. More precisely, once the search tree has been generated, the sequences of candidate characters from the root to a last level are used to generate candidate words.

As an example, let us assume that the set of candidate words are the following:

TABLE 1

| Set of candidate words | |
| --- | --- |
| First candidate word | "Apple" |
| Second candidate word | "Apolo" |
| Third candidate word | "Aport" |
| Fourth candidate word | "Aplle" |

Ranking the Candidate Words

The word correction routine 308 is configured to generate a candidate word pair for each of the candidate words within the set of candidate words and input it into the MLA 314. More precisely, the word correction routine 308 is configured to pair each of the candidate words with the second word 704 to generate the candidate word pair.

Each of the candidate word pairs are then inputted into the MLA 314, which determines the set of features for each candidate word pairs.

As has been described above, the MLA 314 has been using likely mistypes and unlikely mistypes of a given word and has generated the inferred function that can rank correction candidates for mistyped words. During the in-use phase, the MLA 314 is configured to use this inferred function to predict, using the set of features for each candidate words pairs (one of the words being a potentially mistyped word and the other word being a correction candidate), a likelihood that a given correction candidate is indeed the correction for the potentially mistyped words, and to rank the correction candidate words based on this determined likelihood.

As an example, the highest ranked candidate word pair comprises a correctly typed candidate word which is determined by the MLA 314 to be the same as the second word 704 if the second word 704 is correctly typed. Alternatively, the highest ranked candidate word pair comprises the candidate word that corresponds to the correctly typed second word 704 if the second word 704 is mistyped.

As such following the example shown in Table 1 above, the MLA 314 will rank highest the candidate word pair that is associated with the first candidate word "Apple".

Upon determining the highest ranked candidate word, the word correction routine 308 is configured to transmit a data packet 706, which comprises the candidate word associated with the highest ranked candidate word pair, to the search engine service 124.

Upon receiving the data packet 706, the search engine service 124 is configured to generate a modified text phrase, which corresponds to the text phrase originally received via the data packet 130 having replaced the second word 704 with the highest ranked candidate word. Thus for example, if the text phrase corresponded to "Where to go pick appoe?" the modified text phrase would correspond to "Where to go pick apple?".

Upon generating the modified text phrase, the search engine service 124 is configured to: (i) execute the web search using the text phrase and providing the modified text phrase as the suggested search query on the generated SERP; or (ii) execute the web search using the modified text phrase.

In some embodiments, the error correction application 128 is configured to execute the above process for each word contained within the text phrase. This would allow the error correction application 128 not to have access to a dictionary, therefore requiring less memory. Needless to say, it is also contemplated that the error correction application 128 has access to a dictionary, and is configured to only select for correction (as described above) words that are not found within the dictionary.

Moreover, it would be apparent to those skilled in the art that the present technology may allow the correction of a mistyped word resulting from at least one of an inaccurate keyboard input and a wrong keyboard layout without the need of building a database of correct words and associated mistypes, thereby requiring less computation energy and storage.

Although the in-use phase description of the error correction application 128 has been done with reference to the search engine service 124, it is not limited as such. It would be understood that the error correction application 128 may be implemented with different services. For example, and not as a limitation, the error correction application 128 may be downloaded and stored within the electronic device 102 and work in conjunction with any short-messaging applications (not shown).

Figure 8:
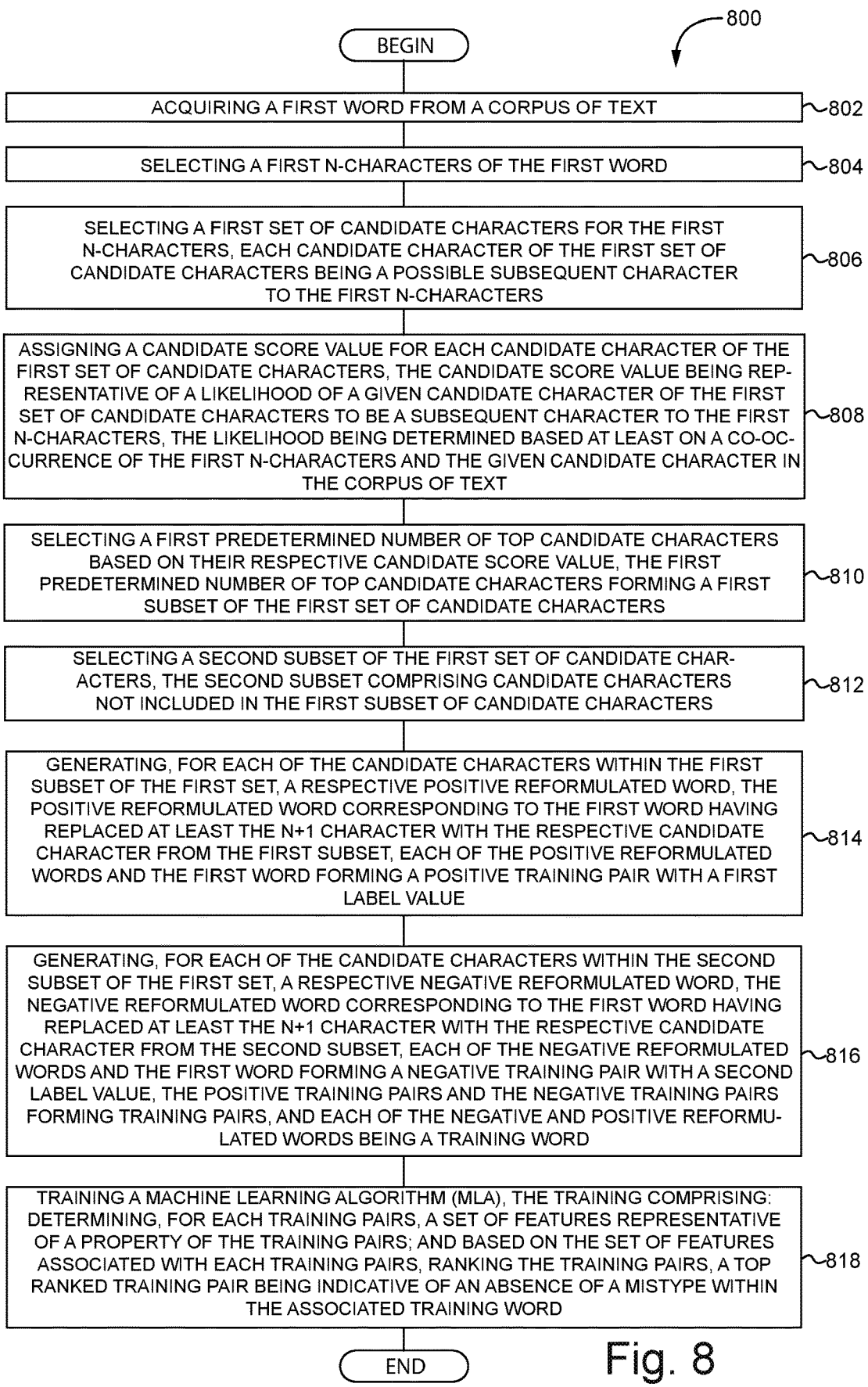
FIG. 8 depicts a block diagram of a flow chart of a method for training the machine learning algorithm of FIG. 3.

Given the architecture and examples provided hereinabove, it is possible to execute a computer-implemented method of correcting a mistyped word resulting from at least one of an inaccurate keyboard input and a wrong keyboard layout. With reference to FIG. 8, there is depicted a flow chart of a method 800 for training the MLA 314, the method 800 being executable in accordance with non-limiting embodiments of the present technology. The method 800 can be executed by the server 118.

Step 802: acquiring a first word from a corpus of text

The method 800 will be explained below with reference to a scenario which corresponds to the example used with reference to FIG. 3.

The method 800 starts at step 802, where the word acquisition routine 302 acquires the data packet 310, which comprises the first word 312. In some embodiments, the data packet 310 is transmitted from the search log database 126. In some embodiments, the first word 312 is selected by an operator of the server 118.

Scenario: The word acquisition routine 302 acquires the data packet 310, which comprises the first word 312 that corresponds to "apple" from the search log database 126.

Step 804: selecting a first n-characters of the first word

At step 804, the word acquisition routine 302 is configured to parse the first word 312 and select the first n-characters 402 of the first word 312.

Scenario: The word acquisition routine 302 parses the first word 312 and select the first n-characters 402 that corresponds to "ap".

Step 806: selecting a first set of candidate characters for the first n-characters, each candidate character of the first set of candidate characters being a possible subsequent character to the first n-characters At step 806, the candidate score generation routine 304 is configured to determine the first set of candidate characters 404 which comprises one or more candidate characters that each is a possible subsequent character to the first n-characters 402.

Scenario: Upon selecting the first n-characters 402, the candidate score generation routine 304 is configured to build the search tree 400, where the root of the search tree 400 comprises the first n-characters 402, and the first level of the search tree 400 comprises the first set of candidate characters 404. Each candidate character forming the first set of candidate characters 404 is a possible subsequent character to the first n-characters 402. The first set of candidate characters 404 comprises the first candidate character 406, the second candidate character 408, the third candidate character 410, the fourth candidate character 412 and the fifth candidate character 414.

Step 808: assigning a candidate score value for each candidate character of the first set of candidate characters, the candidate score value being representative of a likelihood of a given candidate character of the first set of candidate characters to be a subsequent character to the first n-characters, the likelihood being determined based at least on a co-occurrence of the first n-characters and the given candidate character in the corpus of text At step 808, the candidate score generation routine 304 is configured to assign the candidate score value to each candidate characters of the first set of candidate characters 404.

In some embodiments, the candidate score value is determined based on at least one of two scores, namely the co-occurrence score value, and the penalty score value.

In some embodiments, the co-occurrence score value represents the likelihood a given candidate character being the subsequent character to the first n-characters 402 based on the co-occurrence of the first n-characters 402 and the given candidate character in previously executed search queries stored within the search log database 126.

Scenario: The candidate score generation routine 304 calculates the candidate score value of the first candidate character 406, the second candidate character 408, the third candidate character 410, the fourth candidate character 412 and the fifth candidate character 414.

Step 810: selecting a first predetermined number of top candidate characters based on their respective candidate score value, the first predetermined number of top candidate characters forming a first subset of the first set of candidate characters.

At step 810, the candidate score generation routine 304 is configured to select the first predetermined number of top candidate characters based on their respective candidate score value determined in step 808

Scenario: The candidate score generation routine 304 selects the first 2 top candidate characters with a highest candidate score value, namely the fourth candidate character 412 and the fifth candidate character 414.

The candidate score generation routine 304 further expands the search tree 400 to a second level solely for the selected first predetermined number of top candidate characters (i.e. the fourth candidate character 412 and the fifth candidate character 414).

Step 812: selecting a second subset of the first set of candidate characters, the second subset comprising candidate characters not included in the first subset of candidate characters At step 812, the candidate score generation routine 304 is configured to select, at least a portion of, the discarded candidate characters in step 810.

Scenario: The candidate score generation routine 304 discards the candidate characters that have not been selected in step 810 for expanding the search tree 400 (such as the first candidate character 406, the second candidate character 408 and the third candidate character 410).

Step 814: generating, for each of the candidate characters within the first subset of the first set, a respective positive reformulated word, the positive reformulated word corresponding to the first word having replaced at least the n+1 character with the respective candidate character from the first subset, each of the positive reformulated words and the first word forming a positive training pair with a first label value At step 814, the reformulated word generation routine 306 is configured to generate a respective positive reformulated word for each first predetermined number of top candidate characters selected in step 810.

Each respective positive reformulated word corresponds to the first word 312 having replaced at least the n+1 character with the respective candidate character selected in step 810.

The word correction routine 308 is then configured to generate the set of positive training 602 which comprises each of the positive reformulated words paired with the first word 312, and further associated with the first label value.

Scenario: Having generated the search tree 400, the reformulated word generation routine 306 generates the first positive reformulated word 504 (i.e. "apole") and the second positive reformulated word 506 (i.e. "applr").

For example, the first positive reformulated word 504 has been generated by at least substituting the third character of the first word 312 (which corresponds to the n+1 character of the first word 312) with the fourth candidate character 412 which has been previously determined to be in the first predetermined number of top candidate characters in step 810.

The word correction routine 308 generates the set of positive training pairs 602, which comprises the first positive training pair 604 and the second positive training pair 606. The first positive training pair 604 comprises the pairing of the first positive reformulated word 504 and the first word 312. The second positive training pair 606 comprises the pairing of the second positive reformulated word 506 with the first word 312.

The word correction routine 308 further associates the first label value to the set of positive training pairs 602.

Step 816: generating, for each of the candidate characters within the second subset of the first set, a respective negative reformulated word, the negative reformulated word corresponding to the first word having replaced at least the n+1 character with the respective candidate character from the second subset, each of the negative reformulated words and the first word forming a negative training pair with a second label value, the positive training pairs and the negative training pairs forming training pairs, and each of the negative and positive reformulated words being a training word At step 814, the reformulated word generation routine 306 is configured to generate a respective negative reformulated word for each candidate characters selected in step 812.

Each respective negative reformulated word corresponds to the first word 312 having replaced at least the n+1 character with the respective candidate character selected in step 812.

The word correction routine 308 is then configured to generate the set of negative training pairs 607 which comprises each of the negative reformulated words paired with the first word 312, and further associated with the second label value.

The set of positive training pairs 602 generated in step 814, and the set of negative training pairs 607 form the training data for training the MLA 314, and each of the negative and positive reformulated words are considered as a training word.

Scenario: The reformulated word generation routine 306 generates the first negative reformulated word 510 (i.e. "apale") and the second negative reformulated word 512 (i.e. "appae").

For example, the first negative reformulated word 510 has been generated by at least substituting the third character of the first word 312 (which corresponds to the n+1 character of the first word 312) with the first candidate character 406 which has been previously discarded in step 812.

The word correction routine 308 generates the set of negative training pairs 607, which comprises the first negative training pair 608 and the second negative training pair 610. The first negative training pair 608 comprises the pairing of the first negative reformulated word 510 and the first word 312. The second negative training pair 610 comprises the pairing of the second negative reformulated word 512 with the first word 312.

The word correction routine 308 further associates the second label value to the set of negative training pairs 607.

Step 818: training a machine learning algorithm (MLA), the training comprising: determining, for each training pairs, a set of features representative of a property of the training pairs; and based on the set of features associated with each training pairs, ranking the training pairs, a top ranked training pair being indicative of an absence of a mistype within the associated training word At step 818, the word correction routine 308 is configured to train the MLA 314 by inputting the training data (i.e. the set of positive training pairs 602 and the set of negative training pairs 607) into the MLA 314.

The MLA 314 comprises training logic to determine the set of features for each of the training pairs. In some embodiments, the set of features for a given training pair include, but is not limited to: (i) the URL feature, (ii) the word presence feature, and (iii) the user-click feature. The MLA 314 is further configured to rank the training pairs based on the set of features.

In some embodiments, the top ranked training pair is indicative of an absence of a mistype within the associated training word.

Scenario: The word correction routine 308 inputs the set of positive training pairs 602 and the set of negative training pairs 607 into the MLA 314 for training.

It should be apparent to those skilled in the art that at least some embodiments of the present technology aim to expand a range of technical solutions for addressing a particular technical problem, namely correcting a mistyped word resulting from at least one of an inaccurate keyboard input and a wrong keyboard layout, thus improving energy consumption and memory allocation.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method for correcting a mistyped word resulting from at least one of an inaccurate keyboard input and a wrong keyboard layout, the method executable by a server, the method comprising, at a training phase:
   acquiring a first word from a corpus of text;
   selecting a first n-characters of the first word, wherein n corresponds to a numerical value;
   selecting a first set of candidate characters for the first n-characters, each candidate character of the first set of candidate characters being a possible subsequent character to the first n-characters;
   assigning a candidate score value for each candidate character of the first set of candidate characters, the candidate score value being representative of a likelihood of a given candidate character of the first set of candidate characters to be a subsequent character to the first n-characters, the candidate score value being determined by:
      determining a co-occurrence score value indicative of a co-occurrence of the first n-characters and the given candidate character in the corpus of text;
      determining a penalty score value of the given candidate character, the penalty score value being indicative of an unlikeliness of the given candidate character being a subsequent character to the first n-characters of the first word, the determining the penalty score value comprises:
         selecting a default keyboard layout;
         determining a presence of a first keyboard key associated with the given candidate character in the default keyboard layout;
         upon determining the presence of the second keyboard key in the default keyboard layout:
            determining a location of the first keyboard key within the default keyboard layout;
            determining a location of a second key associated with the n+1 character of the first word in the default keyboard layout;
            determining a distance between the first keyboard key and the second keyboard key;
            assigning the penalty score value based on the determined distance; and
      adjusting the previously determined co-occurrence score value with the penalty score value;
   selecting a first predetermined number of top candidate characters based on their respective candidate score value, the first predetermined number of top candidate characters forming a first subset of the first set of candidate characters;
   selecting a second subset of the first set of candidate characters, the second subset comprising candidate characters not included in the first subset of candidate characters;
   generating, for each of the candidate characters within the first subset of the first set, a respective positive reformulated word, the positive reformulated word corresponding to the first word having replaced at least the n+1 character with the respective candidate character from the first subset, each of the positive reformulated words and the first word forming a positive training pair with a first label value;
   generating, for each of the candidate characters within the second subset of the first set, a respective negative reformulated word, the negative reformulated word corresponding to the first word having replaced at least the n+1 character with the respective candidate character from the second subset, each of the negative reformulated words and the first word forming a negative training pair with a second label value,
      the positive training pairs and the negative training pairs forming training pairs, and each of the negative and positive reformulated words being a training word;
   training a machine learning algorithm (MLA), the training comprising:
      determining, for each training pairs, a set of features representative of a property of the training pairs; and
      based on the set of features associated with each training pairs, ranking the training pairs, a top ranked training pair being indicative of an absence of a mistype within the associated training word.

2. The method of claim 1, further comprising:
   at an in-use phase:
      acquiring a text phrase for processing from a client device, the text phrase comprising at least a second word;
      selecting the first n-characters of the second word;
      selecting a second set of candidate characters, each candidate character of the second set of candidate characters being a possible subsequent character to the first n-characters of the second word;

determining the candidate score value for each candidate characters of the second set;
selecting a second predetermined number of top candidate characters based on their respective candidate score value;
generating, for each of the second predetermined number of top candidate characters, a respective candidate word, the candidate word corresponding to the second word having replaced at least the n+1 character with the respective second predetermined number of top candidate characters, each of the candidate words and the second word forming a candidate word pair;
ranking each of the candidate word pair using the MLA to determine the top ranked candidate word pair;
generating a modified text phrase, the modified text phrase corresponding to the text phrase having replaced the second word with the candidate word associated with the top ranked candidate word pair.

3. The method of claim 2, wherein determining the co-occurrence score comprises:
determining a set of words having the same first n-characters from the corpus of text; and
determining a frequency of each candidate character of the first set of candidate characters co-occurring within the set of words after the first-n characters.

4. The method of claim 1, wherein
upon determining that the first keyboard key is not present within the default keyboard layout, assigning a constant value to the given candidate character as the penalty score value.

5. The method of claim 1, wherein the server is coupled to:
a plurality of client devices via a communication network;
a search log database, the search log database comprising previously submitted search queries from the plurality of client devices; and
wherein:
the corpus of text is the previously submitted search queries.

6. The method of claim 5, wherein the server is further coupled to:
a crawler database, the crawler database comprising one or more indications of uniform resource locators (URLs) associated with web resources;
the search log database further comprises:
a plurality of search engine result pages (SERPs) generated in response to the previously submitted search queries;
one or more user interactions received by one or more client devices with the plurality of SERPs, the one or more user interactions comprising at least a presence of a user selecting a suggested search query from a given SERP generated in response to a given search query;
the set of features of a training pair comprises at least one of:
a uniform resource locator (URL) feature, the URL feature being associated with a presence of the given training word and the first word in the URLs stored within the crawler database;
a word presence feature, the word presence feature being associated with a presence of the given training word and the first word in at least one web resource accessed using the URLs stored within the crawler database; and
a user-click feature, the user-click feature being associated with a frequency of the user selecting the suggested search query corresponding to the given training word in response to the user having entered the first word as the search query.

7. The method of claim 5, wherein the selecting the first word from the previously submitted search queries comprises:
selecting the first word from a pool of a pre-determined correctly typed previously submitted search queries, the pre-determination having been executed by an assessor.

8. A computer implemented method for correcting a mistyped word resulting from at least one of an inaccurate keyboard input and a wrong keyboard layout, the method executable by a server, the method comprising:
acquiring a text phrase for processing from a client device, the text phrase comprising at least a first word;
selecting a first n-characters of the first word, wherein n corresponds to a numerical value;
selecting a first set of candidate characters, each candidate character of the first set of candidate characters being a possible subsequent character to the first n-characters of the first word;
assigning a candidate score value for each candidate character of the first set of candidate characters, the candidate score value being representative of a likelihood of a given candidate character of the first set of candidate characters to be a subsequent character to the first n-characters, the candidate score value being determined by:
determining a co-occurrence score value indicative of a co-occurrence of the first n-characters and the given candidate character in the corpus of text;
determining a penalty score value of the given candidate character, the penalty score value being indicative of an unlikeliness of the given candidate character being a subsequent character to the first n-characters of the first word, the determining the penalty score value comprises:
selecting a default keyboard layout;
determining a presence of a first keyboard key associated with the given candidate character in the default keyboard layout;
upon determining the presence of the second keyboard key in the default keyboard layout:
determining a location of the first keyboard key within the default keyboard layout;
determining a location of a second key associated with the n+1 character of the first word in the default keyboard layout;
determining a distance between the first keyboard key and the second keyboard key;
assigning the penalty score value based on the determined distance; and
adjusting the previously determined co-occurrence score value with the penalty score value;
selecting a predetermined number of top candidate characters based on their respective candidate score value, the predetermined number of top candidate characters forming a first subset of the first set of candidate characters;
generating, for each predetermined number of top candidate characters, a respective candidate word, the candidate word corresponding to the first word having replaced at least the n+1 character with a respective predetermined number of top candidate characters, each of the candidate words and the first word forming a candidate word pair;

determining, for each candidate word pairs, a set of features representative of a property of the candidate word pair;

ranking each of the candidate word pair, based on the associated set of features, using a MLA to determine the top ranked candidate word pair; and generating a modified text phrase, the modified text phrase corresponding to the text phrase having replaced the first word with the candidate word associated with the top ranked candidate word pair.

9. The method of claim 8, wherein determining the co-occurrence score comprises:
  determining a set of words having the same first n-characters from the corpus of text; and
  determining a frequency of each candidate character of the first set of candidate characters co-occurring within the set of words after the first-n characters.

10. The method of claim 9, wherein the server is coupled to:
  a plurality of client devices via a communication network;
  a search log database, the search log database comprising previously submitted search queries from the plurality of client devices; and
  wherein:
    the corpus of text is the previously submitted search queries.

11. The method of claim 10, wherein the server is further coupled to:
  a crawler database, the crawler database comprising one or more indications of uniform resource locators (URLs) associated with web resources;
  the search log database further comprises:
    a plurality of search engine result pages (SERPs) generated in response to the previously submitted search queries;
    one or more user interactions received by one or more client devices with the plurality of SERPs, the one or more user interactions comprising at least a presence of a user selecting a suggested search query from a given SERP generated in response to a given search query;
  the set of features of a candidate word pair comprises at least one of:
    a uniform resource locator (URL) feature, the URL feature being associated with a presence of a given candidate word and the first word in the URLs stored within the crawler database;
    a word presence feature, the word presence feature being associated with a presence of the given candidate word and the first word in at least one web resource accessed using the URLs stored within the crawler database; and
    a user-click feature, the user-click feature being associated with a frequency of the user selecting the suggested search query corresponding to the candidate training word in response to the user having entered the first word as the search query.

12. The method of claim 8, wherein upon determining that the second keyboard key is not present on the default keyboard layout, assigning a constant value to the given candidate character as the penalty score value.

13. The method of claim 8, wherein
the first word is a mistyped word; and
the candidate word associated with the top ranked candidate word pair is a correctly spelled second word.

14. The method of claim 8, wherein:
the first word is a correctly spelled word; and the candidate word associated with the top ranked candidate word pair is the second word.

15. The method of claim 8, wherein
the server comprises a search engine service;
the text phrase is a search query; and
processing the modified text phrase comprises one of:
  sending the modified text phrase to the client device as a suggested search query; and
  executing a web search using the modified text phrase.

16. A server for correcting a mistyped word resulting from at least one of an inaccurate keyboard input and a wrong keyboard layout, the server comprising a processor configured to, during a training phase:
  acquire a first word from a corpus of text;
  select a first n-characters of the first word, wherein n corresponds to a numerical value;
  select a first set of candidate characters for the first n-characters, each candidate character of the first set of candidate characters being a possible subsequent character to the first n-characters;
  assign a candidate score value for each candidate character of the first set of candidate characters, the candidate score value being representative of a likelihood of a given candidate character of the first set of candidate characters to be a subsequent character to the first n-characters, the candidate score value being determined by:
    determine a co-occurrence score value indicative of a co-occurrence of the first n-characters and the given candidate character in the corpus of text;
    determine a penalty score value of the given candidate character, the penalty score value being indicative of an unlikeliness of the given candidate character being a subsequent character to the first n-characters of the first word, the determining the penalty score value comprises:
    select a default keyboard layout;
      determine a presence of a first keyboard key associated with the given candidate character in the default keyboard layout;
      upon determining the presence of the second keyboard key in the default keyboard layout:
        determine a location of the first keyboard key within the default keyboard layout;
        determine a location of a second key associated with the n+1 character of the first word in the default keyboard layout;
        determine a distance between the first keyboard key and the second keyboard key;
        assign the penalty score value based on the determined distance; and
      adjust the previously determined co-occurrence score value with the penalty score value;
  select a first predetermined number of top candidate characters based on their respective candidate score value, the first predetermined number of top candidate characters forming a first subset of the first set of candidate characters;
  select a second subset of the first set of candidate characters, the second subset comprising candidate characters not included in the first subset of candidate characters;
  generate, for each of the candidate characters within the first subset of the first set, a respective positive reformulated word, the positive reformulated word corresponding to the first word having replaced at least the n+1 character with the respective candidate character from the first subset, each of the positive reformulated words and the first word forming a positive training pair with a first label value;

generate, for each of the candidate characters within the second subset of the first set, a respective negative reformulated word, the negative reformulated word corresponding to the first word having replaced at least the n+1 character with the respective candidate character from the second subset, each of the negative reformulated words and the first word forming a negative training pair with a second label value, the positive training pairs and the negative training pairs forming training pairs, and each of the negative and positive reformulated words being a training word;

train a machine learning algorithm (MLA), the training comprising:

determine, for each training pairs, a set of features representative of a property of the training pairs; and based on the set of features associated with each training pairs, rank the training pairs, a top ranked training pair being indicative of an absence of a mistype within the associated training word.

17. The server of claim 16, further comprising:
a network interface for communicatively coupling to a communication network;
the processor further configured to, at an in-use phase:
acquire a text phrase for processing from a client device, the text phrase comprising at least a second word;
select the first n-characters of the second word;
select a second set of candidate characters, each candidate character of the second set of candidate characters being a possible subsequent character to the first n-characters of the second word;
determine the candidate score value for each candidate characters of the second set;
select a second predetermined number of top candidate characters based on their respective candidate score value;
generate, for each of the second predetermined number of top candidate characters, a respective candidate word, the candidate word corresponding to the second word having replaced at least the n+1 character with the respective second predetermined number of top candidate characters, each of the candidate words and the second word forming a candidate word pair;
rank each of the candidate word pair using the MLA to determine the top ranked candidate word pair;
generate a modified text phrase, the modified text phrase corresponding to the text phrase having replaced the second word with the candidate word associated with the top ranked candidate word pair.

18. The server of claim 16, wherein the server is coupled to:
a plurality of client devices via the communication network;
a search log database, the search log database comprising previously submitted search queries from the plurality of client devices; and
wherein:
the corpus of text is the previously submitted search queries.

* * * * *